Figure 13:
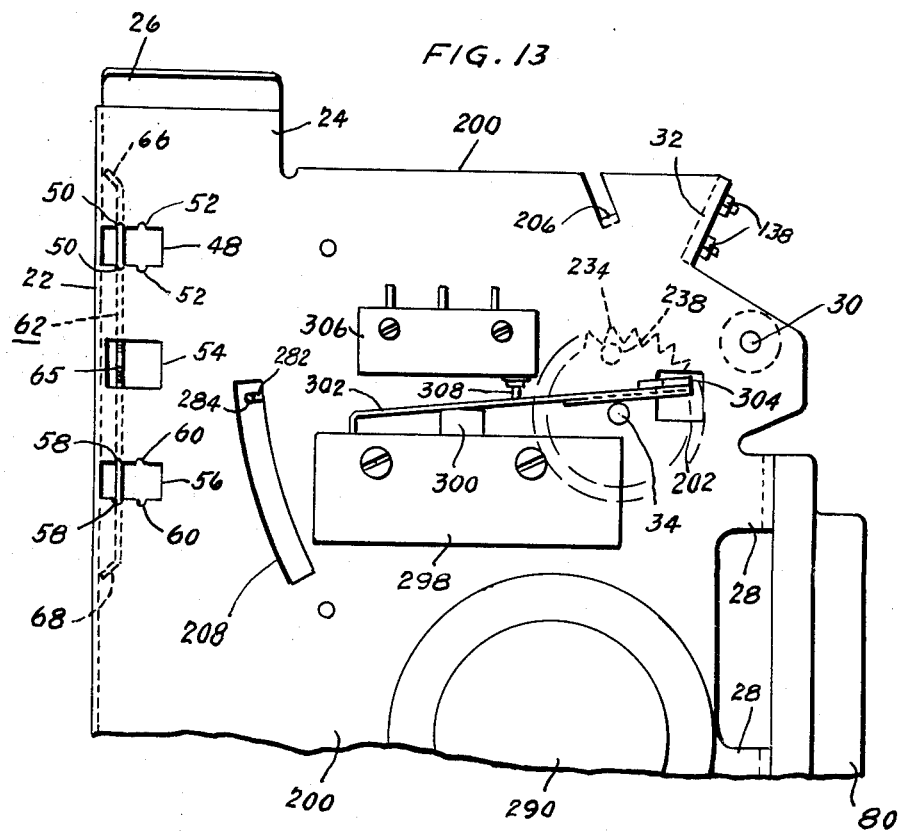

Nov. 2, 1965   G. F. ERICKSON   3,215,242
COIN SEPARATORS
Filed Oct. 28, 1960   6 Sheets-Sheet 1
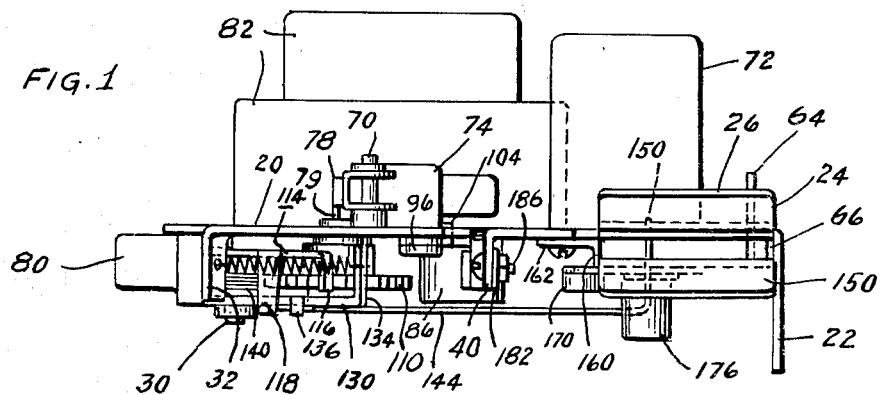
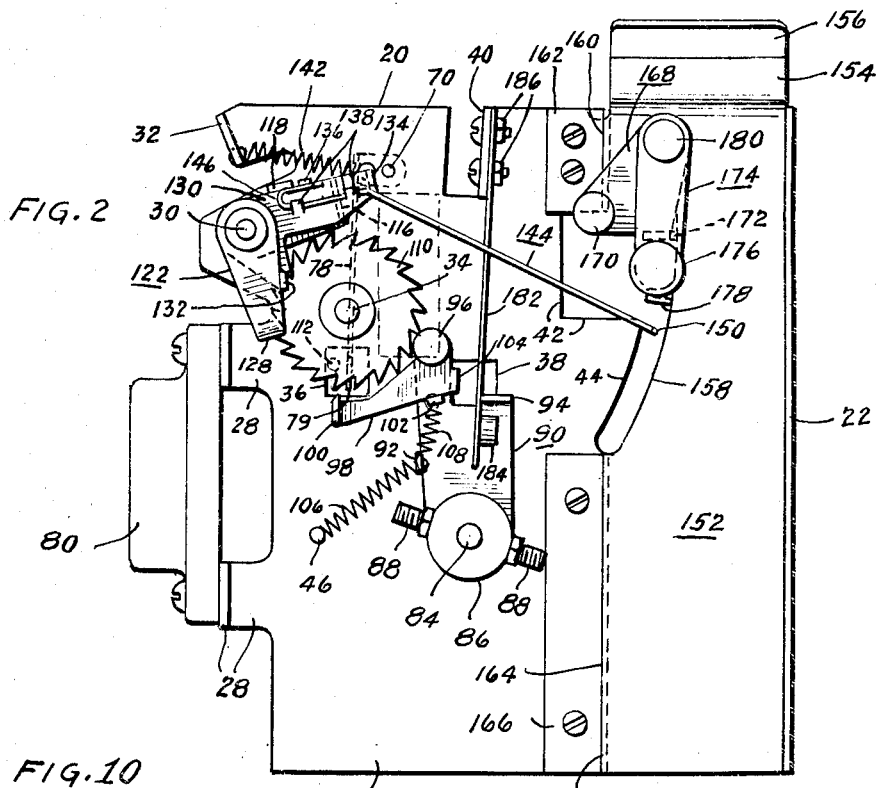
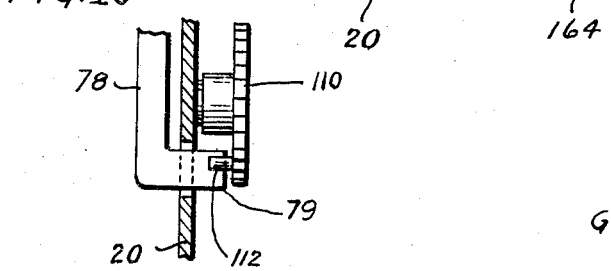
INVENTOR
GUSTAV F. ERICKSON
BY Rey Eilers
ATT'Y.

Nov. 2, 1965  G. F. ERICKSON  3,215,242
COIN SEPARATORS
Filed Oct. 28, 1960  6 Sheets-Sheet 2
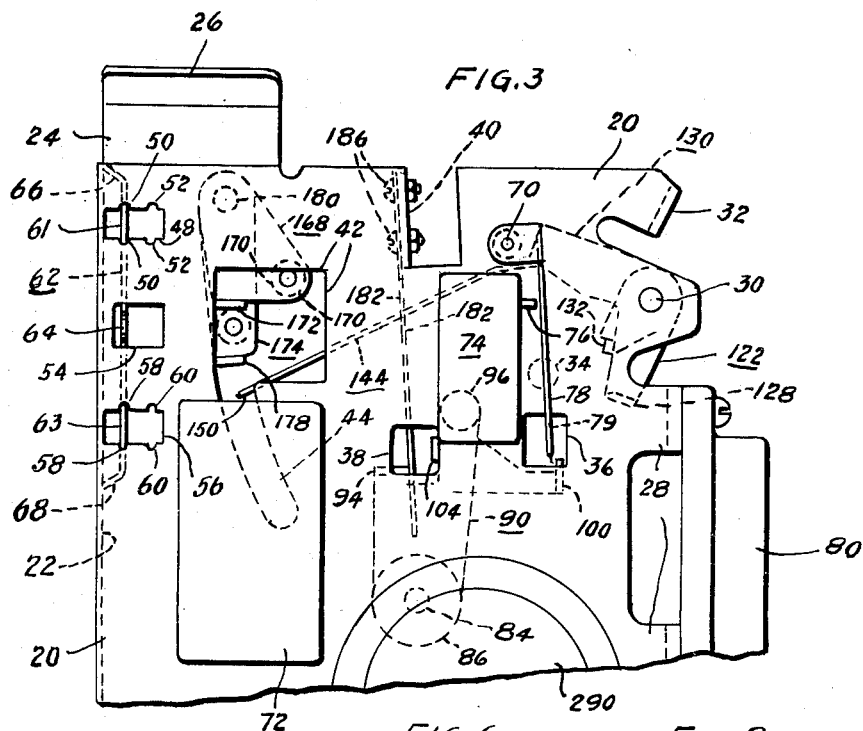
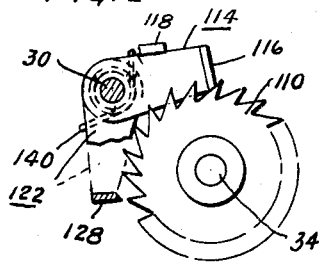
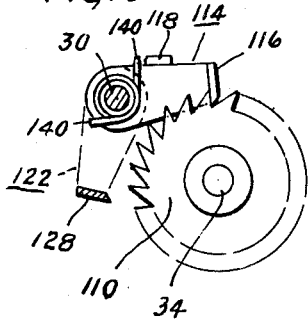
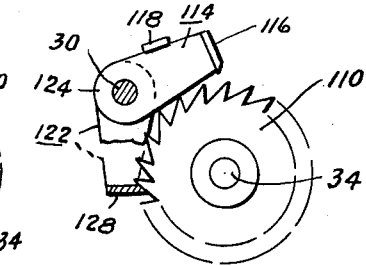
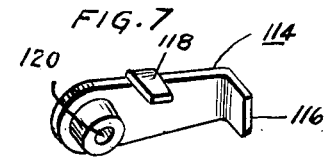
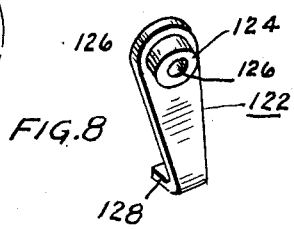
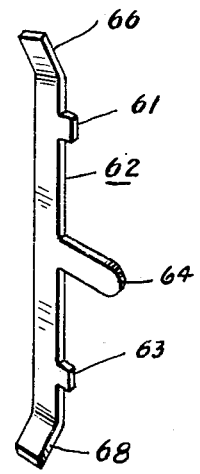
INVENTOR
GUSTAV F. ERICKSON
BY  ATT'Y.

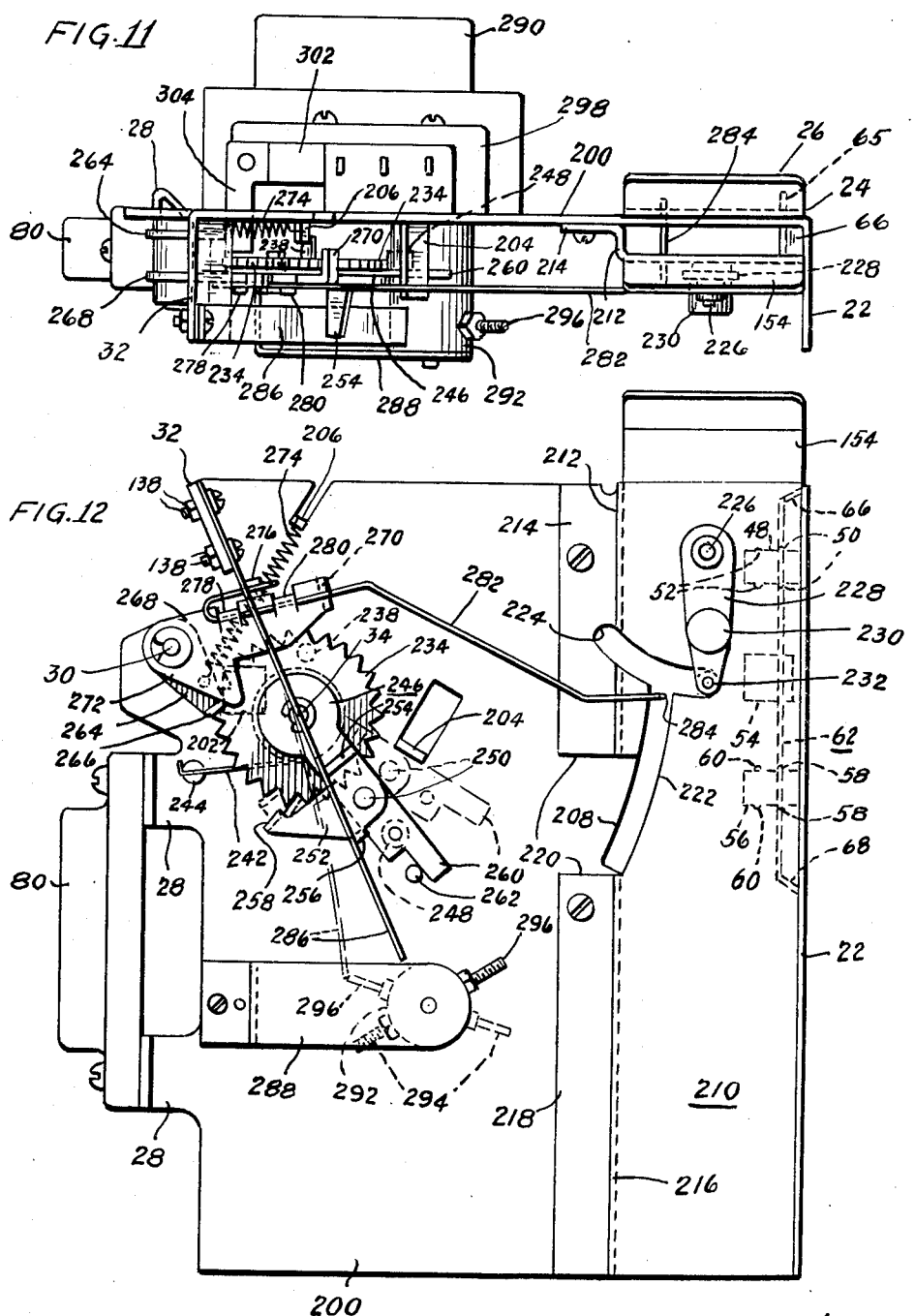

Nov. 2, 1965 G. F. ERICKSON 3,215,242
COIN SEPARATORS
Filed Oct. 28, 1960 6 Sheets-Sheet 4

INVENTOR
GUSTAV F. ERICKSON
BY Ray Eilers ATT'Y.

Nov. 2, 1965   G. F. ERICKSON   3,215,242
COIN SEPARATORS
Filed Oct. 28, 1960   6 Sheets-Sheet 5

INVENTOR.
GUSTAV F. ERICKSON
BY Ray Eilers
ATT'Y.

Nov. 2, 1965　　　G. F. ERICKSON　　　3,215,242
COIN SEPARATORS
Filed Oct. 28, 1960　　　　　　　　　　　　6 Sheets-Sheet 6

INVENTOR.
GUSTAV F. ERICKSON
BY　Rey Eilers　ATT'Y.

United States Patent Office 3,215,242
Patented Nov. 2, 1965

3,215,242
COIN SEPARATORS
Gustav F. Erickson, Kirkwood, Mo., assignor to National Rejectors, Inc., St. Louis, Mo., a corporation of Missouri
Filed Oct. 28, 1960, Ser. No. 65,811
19 Claims. (Cl. 194—19)

This invention relates to improvements in Coin Separators. More particularly, this invention relates to improvements in timing devices for coin-actuated devices.

It is therefore an object of the present invention to provide an improved timing device for coin-actuated devices.

It is frequently desirable to provide timing devices for coin-actuated devices. Those timing devices will respond to the insertion of coins to actuate the coin-actuated devices and will subsequently keep those coin-actuated devices actuated for predetermined periods of time. A number of such timing devices have been proposed, and some of those timing devices have been built and used. However, some of those timing devices were unreliable, and other of those timing devices were unduly complicated and expensive.

The present invention provides a timing device that is simple to construct and to operate and that operates efficiently and certainly. That timing device has an electric switch, and it has a ratchet wheel that is rotatable in one direction to effect closing of that switch and that is rotatable in the opposite direction to effect opening of that switch. The ratchet wheel responds to the insertion of a coin to rotate one step in the said one direction; and that rotation will effect the closing of the switch. That switch will remain closed until that ratchet wheel is rotated one step in the opposite direction; and that ratchet wheel will be rotated in the opposite direction at the end of a predetermined period of time. In this way, the ratchet wheel of the timing device directly controls the length of time the switch is closed.

The closing of the switch sends an impulse to the coin-actuated device, and it also energizes a timing motor in the timing device. That timing motor has a geared-down output shaft, and that output shaft rotates at a predetermined speed. As that output shaft rotates, it gradually stores up energy in a spring and then suddenly releases that energy. The released energy is applied to the ratchet wheel and is sufficient to force that ratchet wheel to rotate one step in the opposite direction, thereby effecting opening of the switch. Upon the opening of the switch, the coin-actuated device will become de-energized and the timing motor also will become de-energized. In this way, the timing motor provides the requisite timing of the operation of the coin-actuated device and also provides automatic return of the ratchet wheel. It is therefore an object of the present invention to provide a timing device which has a ratchet wheel that is rotatable in one direction to effect closing of a switch and that has a timing motor which gradually stores up energy in a spring and then suddenly releases that energy and applies that energy to the ratchet wheel to rotate that ratchet wheel in the opposite direction.

The energy that is stored in the spring is applied to a pawl and is then applied by that pawl to the ratchet wheel. A stop limits the movement of that pawl toward the ratchet wheel, and thereby limits the rotation of the ratchet wheel in the opposite direction to just one step at a time. In this way, overshooting of the ratchet wheel in the opposite direction, and consequent loss of money by the patron, is avoided.

The stop provides an additional function in that it acts to force the pawl into such intimate engagement with the ratchet wheel that the energy applied to that ratchet wheel cannot cause that ratchet wheel to ease the pawl out of the way and then rotate a still further step in the opposite direction. As a result, the present invention positively precludes accidental rotation of the ratchet wheel in the opposite direction.

The rotation of the ratchet wheel provided by the present invention is limited to just one step at a time in the switch-closing direction and is limited to just one step at a time in the opposite direction; but that ratchet wheel can be stepped a number of times in the switch-closing direction and can be stepped a number of times in the switch-opening direction. Each inserted coin can cause that ratchet wheel to advance one step in the switch-closing direction. Advancements of that ratchet wheel, subsequent to the initial advancement of that ratchet wheel, can be effected without any change in the position of the switch, and hence the switch can uninterruptedly maintain the circuit to the coin-actuated device and to the timing motor. At the end of each cycle of predetermined length, the timing motor will gradually store and then suddenly release energy in the spring; and that energy will step the ratchet wheel one step in the opposite direction. That ratchet wheel will step successively in the opposite direction without opening the switch until that ratchet wheel is stepped back into its initial position. In this way, the timing device provided by the present invention can assure uninterrupted and continuous energization of the coin-actuated device and of the timing motor as long as the ratchet wheel is in any position in advance of its initial position.

An escapement mechanism is mounted adjacent the ratchet wheel, and that escapement mechanism forces the advancement of that ratchet wheel to take place one step at a time. That escapement mechanism is operated by each inserted coin; and hence the insertion of a coin will advance the ratchet wheel just one step. While the escapement mechanism must limit the forward advancement of the ratchet wheel to just one step at a time, that escapement mechanism must not interfere with the movement of the ratchet wheel in the opposite direction. The present invention provides such an escapement mechanism; and it is therefore an object of the present invention to provide a coin-operated escapement mechanism that forces the advancement of a ratchet wheel to take place one step at a time but that will not interfere with the movement of that ratchet wheel in the opposite direction.

In one embodiment of the present invention the escapement mechanism will not only force the advancement of the ratchet wheel to take place one step at a time, but it will also apply the forces that advance that ratchet wheel. Such an escapement mechanism is desirable because it frees the ratchet wheel from the variable bias that a spring would apply to that ratchet wheel. It is therefore an object of the present invention to provide a coin-operated escapement mechanism which forces the advancement of a ratchet wheel to take place one step at a time and that actually applies the forces that advance that ratchet wheel.

In some instances it is desirable to require a patron to insert several coins before a coin-actuated device is energized. The patron should be credited with the value of each coin that he inserts, but the actuation of the coin-actuated device should not occur until the last of the specified coins is inserted. A number of devices have been proposed which could require a patron to insert several coins before a coin-actuated device is energized but most of those devices have been expensive. The present invention provides a very simple device that can require a patron to insert several coins before a coin-actuated device is energized; and it is therefore an object of the present invention to provide a simple device that can require a patron to insert several coins before a coin-actuated device is energized.

It would be desirable to provide a coin separator that could readily be adjusted to respond to the insertion of coins of different diameters. For example, it would be desirable to provide a coin separator that could readily be adjusted to respond to the insertion of nickels, dimes, or quarters. Where a coin-actuated devices was equipped with such a coin separator, the owner or operator of that coin-actuated device could readily change the sales price of the vended service or commodity. Moreover, such a coin separator could be manufactured on a mass production basis less expesively than could three coin separators, each of which could accommodate just one of the three coins. The present invention provides a coin separator which can readily be adjusted to respond to the insertion of coins of different diameters. It is therefore an object of the present invention to provide a coin separator which can readily be adjusted to respond to the insertion of coins of different diameters.

The coin separator provided by the present invention has an actuator that will be struck and moved by the inserted coins; and where that coin separator is set to accommodate coins of different diameters but is intended to respond to coins of just one diameter, the coins of the other diameters should be guided away from that actuator. The present invention guides the coins of other diameters away from the actuator by providing a member that normally overlies the free end of that actuator and that guides the coins of other diameters away from that free end. Coins to which the coin separator is intended to respond will engage that member and will move it out of the way so they can engage and move the actuator. In this way, the actuator will be engaged and moved by the coins to which the coin separator is intended to respond, but the coins of other diameters will be guided away from that actuator. It is therefore an object of the present invention to provide a coin separator with a member that normally overlies the free end of the actuator of that coin separator and that guides coins of other diameters away from that free end.

Other and further objects and advantages of the present invention should become apparent from an examination of the drawing and accompanying description.

In the drawing and accompanying description several preferred embodiments of the present invention are shown and described but it is to be understood that the drawing and accompanying description are for the purpose of illustration only and do not limit the invention and that the invention will be defined by the appended claims.

Figure 14:
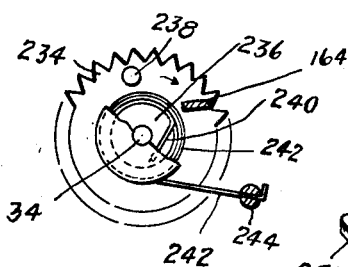
Figure 16:
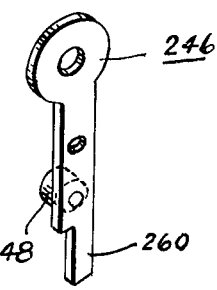
Figure 15:
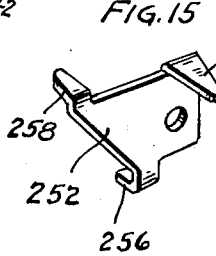
Figure 17:
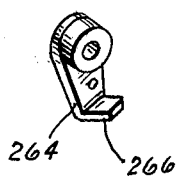
Figure 18:
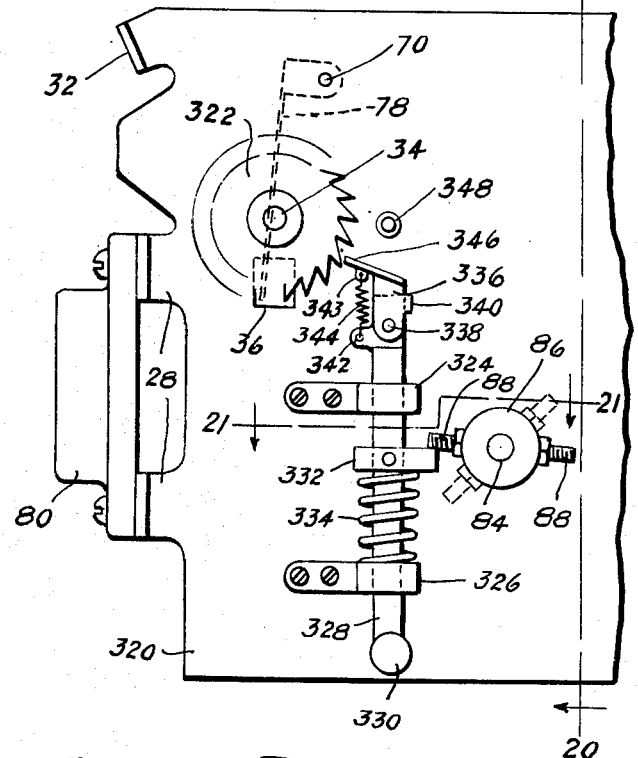
Figure 20:
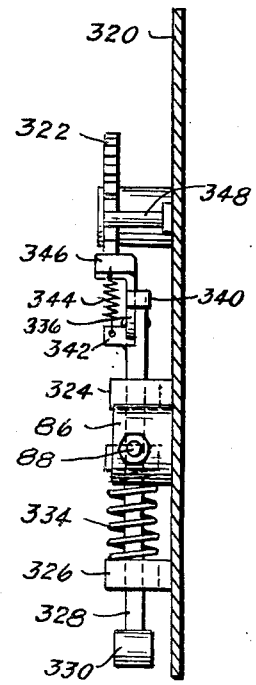
Figure 19:
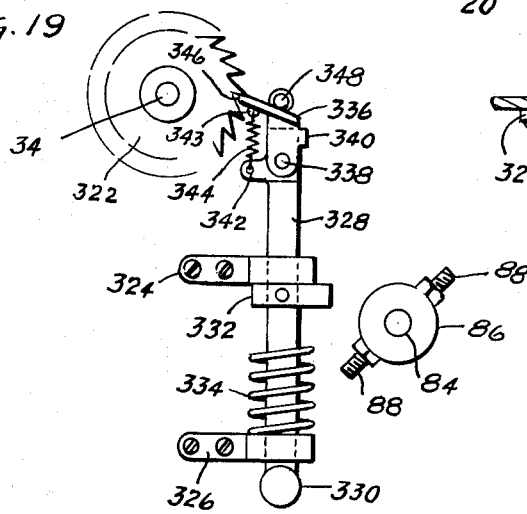
Figure 21:
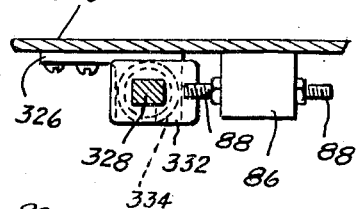
Figure 22:
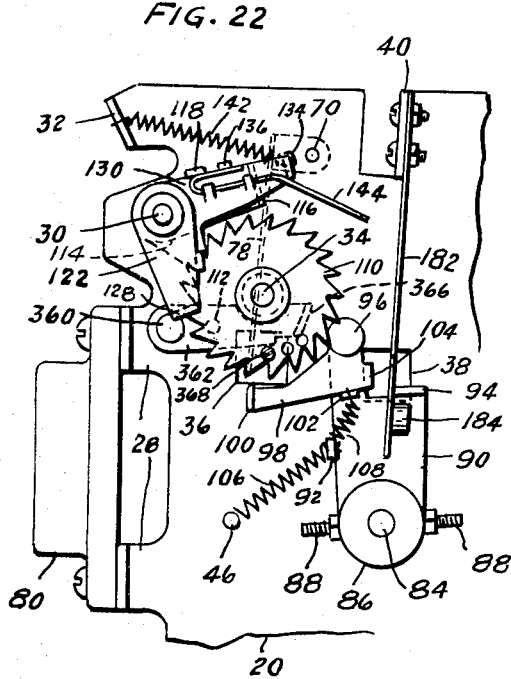
Figure 23:
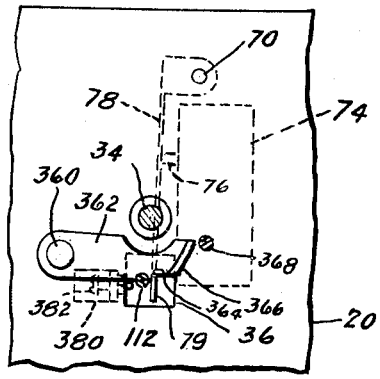
Figure 24:
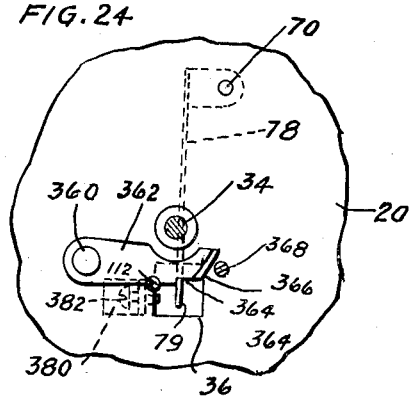
Figure 25:
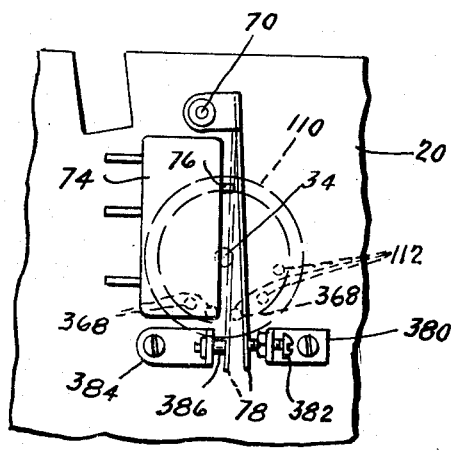

In the drawing, FIG. 1 is a plan view of one embodiment of timing device that is made in accordance with the principles and teachings of the present invention, FIG. 2 is a front elevational view of the timing device of FIG. 1, FIG. 3 is a rear elevational view of the upper portion of the timing device of FIG. 1, FIG. 4 is a partially-broken, partially-sectioned view of the ratchet wheel and of the escapement mechanism of the timing device of FIG. 1, FIG. 5 is a view which is similar to that of FIG. 4 but wherein the said part of the escapement mechanism has been rotated in the clockwise direction, FIG. 6 is a view which is similar to that of FIG. 4 but wherein the said part of the escapement mechanism has been rotated in the counter clockwise direction, FIG. 7 is a perspective view, on a large scale, of a pawl of the escapement mechanism of the timing device of FIG. 1, FIG. 8 is a perspective view, on a large scale of another pawl of the escapement mechanism of the timing device of FIG. 1, FIG. 9 is a perspective view, on a large scale, of a movable partition which is used in the timing device of FIG. 1, FIG. 10 is a sectional view through part of the embodiment of timing device shown in FIG. 1, FIG. 11 is a plan view of a second embodiment of timing device that is made in accordance with the principles and teachings of the present invention, FIG. 12 is a front elevational view of the timing device of FIG. 11, FIG. 13 is a rear elevational view of the upper portion of the timing device of FIG. 11, FIG. 14 is a partially-broken, partially-sectioned rear view of the ratchet wheel and spring of the timing device of FIG. 11, FIG. 15 is a perspective view of a pawl used in the restoring mechanism of the timing device of FIG. 11, FIG. 16 is a perspective view of a lever used in the restoring mechanism of the timing device of FIG. 11, FIG. 17 is a perspective view of a pawl used in the escapement mechanism of the timing device of FIG. 11, FIG. 18 is a front elevational view of a portion of a third embodiment of timing device that is made in accordance with the principles and teachings of the present invention, FIG. 19 is a view which is similar to that of FIG. 18 but it shows the restoring mechanism in restoring position, FIG. 20 is a sectional view of the embodiment of timing device shown in FIG. 18, and it is taken along the plane indicated by the line 20—20 in FIG. 18, FIG. 21 is a sectional view through the restoring mechanism used in the timing device of FIG. 18, and it is taken along the plane indicated by the line 21—21 in FIG. 18, FIG. 22 is a front elevational view of a portion of a fourth embodiment of timing device that is made in accordance with the principles and teachings of the present invention, FIG. 23 is a vertical section through the portion of the timing device shown in FIG. 22, FIG. 24 is a view which is similar to that of FIG. 23 but wherein the stop has been raised, and FIG. 25 is a rear elevational view of a portion of a fifth embodiment of timing device that is made in accordance with the principles and teachings of the present invention.

Referring to FIGS. 1–10, the numeral 20 denotes the main plate of one embodiment of timing device that is made in accordance with the principles and teachings of the present invention. That main plate has a vertically-directed flange 22 at the right-hand edge thereof, and that flange extends forwardly from the plane of that main plate. The main plate 20 has an extension 24 at the top thereof, and that extension is spaced a short distance rearwardly from the plane of that main plate. The upper part of the extension 24 is denoted by the numeral 26, and that upper part inclines upwardly and rearwardly from the rest of that extension. The numeral 28 denotes two ears that are formed at the left-hand edge of the main plate 20, and those ears are generally L-shaped in plan. Those ears initially extend to the left from the left-hand edge of the main plate 20 and then extend forwardly in a plane parallel to the plane of the flange 22.

The main plate 20 has a pivot 30 secured to it; and that pivot is adjacent the upper left-hand corner of that main plate. That pivot can be made in the form of an elongated pin which extends through the main plate and which has its rear end spun over. That pivot has a shoulder intermediate the ends thereof; and that shoulder will abut the front face of the main plate 20 and will coact with the spun-over rear end of that pivot to fixedly hold that pivot in position on the main plate 20. An ear 32 is formed on the main plate 20 above the pivot 30 by bending a portion of the main plate 20 forwardly at right angles to the plane of that main plate. That ear has an opening therein, as shown by FIG. 1.

A second pivot 34 is secured to the main plate 20; and that pivot may also be made in the form of a pin which has a shoulder intermediate the ends thereof. The rear end of that pivot will extend through an opening in the main plate 20 and be spun over; and that spun-over rear end will coact with that shoulder to fixedly secure that pivot to that main plate. The pivot 34 is disposed below the level of, and to the right of, the pivot 30.

The numeral 36 denotes a generally-square opening in the main plate 20, and that opening is located a short distance below the level of the pivot 34. The opening 36 and the pivot 34 are in general vertical registry. The numeral 38 denotes a generally-square opening which is disposed to the right of the opening 36 and which is disposed slightly below the level of the opening 36.

An ear 40 is formed at the upper edge of the main plate 20 by striking that ear out of that upper edge. A large, generally-square opening 42 is formed in the main plate 20 to the right of the ear 40 but below the level of that ear. An arcuate slot 44 is contiguous with the opening 42, and that slot extends downwardly and to the left from the lower-right corner of that opening. The right-hand side of the opening 42 is arcuate, and has the same radius of curvature which the slot 44 has.

The numeral 46 denotes a small pin which is adjacent the lower left-hand corner of the main plate 20. That pin projects forwardly from the front face of that main plate; and that pin is close to the lower of the two ears 28 which are adjacent the left-hand edge of the main plate 20.

Referring to FIG. 3, the numeral 48 denotes a generally-rectangular opening in the main plate 20, and that opening is adjacent the flange 22. That opening has a pair of notches 50 adjacent the left-hand edge of that opening, and it also has a pair of notches 52 disposed to the right of the notches 50. A generally-square opening 54 is disposed below the level of, and in general vertical registry with, the opening 48. However, the opening 54 is narrower than the opening 48. A generally-rectangular opening 56 is disposed below the level of, but in general vertical registry with, the opening 54. The opening 56 is similar to the opening 48; and it has a pair of notches 58 which are in vertical registry with the notches 50. Also, that opening has a pair of notches 60 which are in vertical registry with the notches 52.

A partition is denoted generally by the numeral 62; and that partition has ears 61 and 63 which can be set in the notches of the openings 48 and 56. Specifically, the ear 61 can be set either in the notches 50 or in the notches 52 of the opening 48; and the ear 63 can be set in the notches 58 or in the notches 60 of the opening 56. Whenever the ear 61 is set in the notches 50, the ear 63 will be set in the notches 58; and whenever the ear 61 is set in the notches 52, the ear 63 will be set in the notches 60. The ears 61 and 63 coact with the notches 50 and 52 and with the notches 58 and 60, respectively, to maintain the partition 62 parallel to the flange 22 on the main plate 20. The partition 62 has an ear 64; and that ear is longer than either of the ears 61 and 63. That ear projects rearwardly through the opening 54, and it is easily grasped and held by the fingers of an assembler or service man. The partition 62 has a leading edge 66 that inclines upwardly and to the left in FIG. 3, and it has a trailing edge 68 which includes downwardly and to the left in FIG. 3.

The numeral 70 denotes a pivot that is secured to the main plate 20 adjacent the upper right-hand corner of the rear face of that main plate. The pivot projects rearwardly from the rear face of that main plate at a point intermediate the ears 32 and 40. A relay 72 is secured to the rear face of the main plate 20 at a point below the opening 42. A switch 74 is secured to the rear face of the main plate 20 below the level of the pivot 70, and that switch is disposed to the right of the relay 72, as that switch and relay are viewed in FIG. 3. The switch 74 has a button 76 that normally projects from the casing of that switch, but that button can be pushed into that casing to actuate that switch.

A lever 78 is provided with ears at the upper end thereof, and those ears telescope over the pivot 70 to permit rotation of that lever relative to that pivot. The lever 78 depends downwardly from the pivot 70, and it has an ear 79 formed on the lower end thereof. That ear projects forwardly through the opening 36 in the main plate 20, and the front face of that ear is spaced forwardly of the plane of the front face of that main plate.

The numeral 80 denotes an indicator lamp housing which is secured to the ears 28 at the right-hand edge of the main plate 20, as that main plate is viewed in FIG. 3. The numeral 82 denotes a gear motor which is secured to the rear face of the main plate 20, and that motor is mounted intermediate the relay 72 and the indicator lamp housing 80.

Referring to FIG. 2, the numeral 84 denotes the output shaft of the gear motor 82; and that output shaft is located below, and in vertical registry with, the opening 38 in the main plate 20. A hub 86 is fixedly mounted on the shaft 84, and that hub will rotate with that shaft. Shouldered screws 88 are mounted in threaded sockets in the hub 86; and, as indicated particularly by FIG. 2, those shouldered screws are mounted on a diameter of the hub 86.

The numeral 90 generally denotes a plate-like lever which has the lower end thereof telescoped loosely over the shaft 84 and which is disposed intermediate the front face of the main plate 20 and the rear face of the hub 86. That lever has an ear 92 thereon which has a hole therein; and that ear projects forwardly from the plane of that lever. The lever 90 also has an ear 94 which projects forwardly from the plane of that lever. That second ear is at the right-hand side of the lever 90, and it can be formed conveniently by bending a portion of the right-hand edge of that lever forwardly. A pivot 96 is supported by the narrow upper portion of the lever 90 which projects upwardly above the level of the ear 94.

The pivot 96 rotatably supports a pawl 98; and that pawl has an ear 100 which projects forwardly from the plane of that pawl and which is at the left-hand end of that pawl. The numeral 102 denotes a second ear which projects forwardly from the plane of the pawl 98, and that ear is disposed below the level of the pivot 98, and ear 102 is smaller than the ear 100; but the ear 102 is large enough to have a notch formed in it. An ear 104 is formed on the pawl 98, and that ear extends rearwardly from the plane of that pawl. The ear 104 extends into the opening 38 in the main plate 20, and that ear normally abuts the right-hand edge of the narrow upper portion of the lever 90 which supports the pivot 96.

A helical extension spring 106 has one end thereof hooked through the opening in the ear 92 on the lever 90 and has the other end thereof hooked around the pin 46. A second helical spring 108 has one end thereof hooked through the opening in the ear 92 on the lever 90 and has the other end thereof hooked around the notch in the ear 102 on the pawl 98. The spring 106 biases the lever 90 for rotation in the counter clockwise direction about the shaft 84, and the spring 108 biases the pawl 98 for counter clockwise rotation about the pivot 96. However, the spring 106 can yield to permit clockwise rotation of the lever 90, and the spring 108 can yield to permit clockwise rotation of the pawl 98. The spring 108 normally holds the ear 104 on pawl 98 in engagement with the narrow upper portion of the lever 90, and the spring 106 normally holds the ear 104 against the left-hand edge of the opening 38.

The numeral 110 denotes a ratchet wheel which has a rearwardly-extending hub; and that ratchet wheel and its hub are rotatably mounted on the pivot 34. The ratchet wheel 110 has a pin 112 formed thereon, and that pin extends rearwardly from the rear face of that ratchet wheel. That pin is mounted so it can engage and move the forwardly-projecting ear 79 on the lower end of the switch-actuating lever 78.

The ratchet wheel 110 is mounted forwardly of the plane of the lever 90, and it is also mounted forwardly of the plane of the pawl 98. In addition, that ratchet wheel is mounted forwardly of the pivot 96. As a result, that ratchet wheel can normally rotate without any interference from the lever 90, the pivot 96 or the pawl 98. However, the ear 100 on the pawl 98 underlies that ratchet wheel; and that ear can be, and is intended to be, moved up into engagement with the teeth on that ratchet wheel.

The numeral 114 generally denotes a pawl which is shown particularly by FIG. 7; and that pawl has an ear 116 at the right-hand edge thereof and has an ear 118 at the top edge thereof. Both of those ears extend forwardly from the plane of that pawl. A hub is formed on the pawl 114 adjacent the left-hand end of that pawl, and an opening 120 in the hub and in that pawl telescopes freely over the pivot 30 carried by the main plate 20. The rear face of the pawl 114 will confront the shoulder on the pivot 30; and that shoulder will space that pawl forwardly of the front face of the main plate 20.

The numeral 122 generally denotes a pawl which has a hub 124 adjacent the upper end thereof. That pawl and that hub have an opening 126 which can telescope freely over the pivot 30 carried by the main plate 20. That pawl will be mounted adjacent the outer end of the pivot 30. The numeral 128 denotes an ear which is formed on the lower end of the pawl 122, and that ear extends rearwardly from the plane of that pawl. The ear 128 will be in register with the teeth on the ratchet wheel 110 but will terminate short of the front face of the main plate 20.

The numeral 130 denotes a generally L-shaped lever; and that lever is rotatably mounted on the pivot 30. The lever 130 is disposed intermediate the pawls 114 and 122; and its front face abuts the rear face of the pawl 122. The long arm of the lever 130 extends to the right from the pivot 30, and the short arm of that lever extends downwardly from the pivot. That short arm has an ear 132 formed thereon, and that ear projects forwardly from the right-hand edge of that short arm. The long arm of the lever 130 has an ear 134 which extends rearwardly from the right-hand end of that arm; and that ear has an opening in it. An ear 136 is formed on, and projects forwardly from, the upper edge of the long arm of the lever 130; and two forwardly-extending lugs 138 are struck out of that long arm. Those lugs are disposed below the level of, and are disposed to the right and to the left of, the ear 136.

The numeral 140 denotes a helical torsion spring which can telescope over the hub of the pawl 114. One end of that spring is hooked over the upper edge of the pawl 114, and the other end of that spring is hooked around the left-hand edge of the pawl 122. As indicated particularly by FIG. 1, the turns of the spring 140 are interposed between the front face of the pawl 114 and the rear face of the L-shaped lever 130. That spring biases the pawl 122 for rotation in the counter clockwise direction and thus normally holds the right-hand edge of that pawl in engagement with the ear 132 on the short arm of lever 130. That spring also biases the pawl 114 for rotation in the clockwise direction and thus normally holds the ear 118 on that pawl in engagement with the upper edge of the long arm of the lever 130. As a result, the pawl 114, the pawl 122 and the L-shaped lever 130 constitute an escapement mechanism which normally rotates as a unit. However, the spring 140 can yield to permit the pawl 122 to move away from the ear 132 on the short arm of the lever 130, and that spring can also yield to permit the long arm of the lever 130 to move downwardly and away from the ear 118 on the pawl 114.

The numeral 142 denotes a helical extension spring which has one end thereof hooked through the opening in the ear 32 on the main plate 20 and which has the other end thereof hooked through the opening in the ear 134 on the long arm of the lever 130. That spring biases the escapement mechanism consisting of the pawl 114, the pawl 112 and the L-shaped lever 130, for rotation in the counter clockwise direction. However, that spring can yield to permit rotation of that escapement mechanism in the clockwise direction.

The numeral 144 generally denotes a wire-like actuator which can be secured to the long arm of the lever 130. That actuator has a U-shaped left-hand end, and the top and bottom portions of that U-shaped left-hand end can be fitted between the lugs 138 and the ear 136 on the long arm of the lever 130. The actuator 144 inclines downwardly and to the right from the long arm of the lever 130, and that actuator has a rearwardly-extending portion 150 at the free end thereof. The portion 150 extends rearwardly into the slot 44 in the main plate 20.

The numeral 152 generally denotes a plate which is disposed forwardly of the front face of the main plate 20 by a distance equal to the width of the partition 62. That plate has an extension 154 at the top thereof, and that extension is in register with the extension 24 at the top of the main plate 20. The extension 154 is offset forwardly from the plane of the plate 152, and the upper end of that extension is inclined upwardly and forwardly from the rest of that extension.

Part of the left-hand edge of the plate 152 is cut away, as indicated by the numeral 158, to make that left-hand edge thereof complementary to the right-hand side of the slot 44 and to the right-hand side of the opening 42 in the main plate 20. The plate 152 has a rearwardly-bent portion 160 which extends to the main plate 20; and a securing flange 162 extends to the left from the bent portion 160. The plate 152 has a second rearwardly-bent portion 164 which extends to the main plate 20; and a securing flange 166 extends to the left from the bent portion 164. The securing flanges 162 and 166 will be suitably secured to the main plate 20 and will space the right-hand portion of the plate 152 forwardly of that main plate.

The numeral 168 denotes a coin deflector, and that coin deflector has a weight 170 adjacent the bottom thereof. That coin deflector has an ear 172 which extends rearwardly from the plane of that deflector and which extends into the opening 42 in the main plate. The numeral 174 generally denotes a second coin deflector, and a weight 176 is provided on that coin deflector. An ear 178 on the coin deflector 174 extends rearwardly from that coin deflector and into the opening 42. The deflector 174 has an opening in the upper end thereof, and a pivot 180 for the coin deflectors 168 and 174 extends through that opening and through a similar opening in the upper end of the coin deflector 168 to be secured to the plate 152. The weights 170 and 176 bias the coin deflectors 168 and 174, respectively, for rotation in the counter clockwise direction in FIG. 2. The ears 172 and 178 on those deflectors respond to that bias to normally abut the left-hand edge of the opening 42, as that opening is viewed in FIG. 3.

The numeral 182 denotes an elongated leaf spring which has a weight 184 secured to it, adjacent the lower end thereof. Fasteners 186 secure the upper end of that spring to the ear 40 on the main plate 20. The lower end of the spring 182 is in the path of the shouldered screws 88 carried by the hub 86; and the outer ends of those shouldered screws will engage and bend that spring as the shaft 84 rotates.

In the normal position of the components of the embodiment of timing device shown in FIGS. 1–10, the actuator 144 will have its coin-receiving portion 150 adjacent the upper end of the slot 44, and the L-shaped lever 130 will be in the position shown by FIG. 2. At this time, the spring 142 will be holding the ear 128 on the pawl 122 in a notch between two teeth on the ratchet wheel 110; and the pawl 114 will have its ear 116 disposed above the level of, and out of engagement with, the outer face of a tooth on that ratchet wheel. The lever 90 will be in the position shown by FIG. 2; and at such time the pawl 98 will have its ear 100 disposed below the level of, and out of engagement with, the ratchet wheel 110. Also, the ear 104 on the pawl 98 will be abutting the left-hand edge of the opening 38. The ears 172 and 178 on the coin deflectors 168 and 174 will be disposed vertically above the coin-receiving portion 150 of the actuator 144; and the pin 112 on the ratchet wheel 110 will be holding the lever 78 in such position as to hold the button of the switch 76 in its retracted position rather than in the extended position shown by FIG. 3.

If the timing device is to be used to accept quarters, the partition 62 will be bodily removed from its position between the plate 152 and the right-hand portion of the main plate 20. At such time, the flange 22 and the rearwardly-extending portions 160 and 164 of the plate 152 will define the width of the coin passageway, and that width will be close enough to the diameter of a quarter to enable the coin passageway to reject oversize coins. If the timing device is to be used to accept nickels, the ears 61 and 63 of the partition 62 will be set in the notches 50 and 58 respectively of the openings 48 and 56. At such time, the partition 62 and the rearwardly extending portions 160 and 164 of the plate 152 will define the width of the coin passageway; and that width will be close enough to the diameter of a nickel to enable the coin passageway to reject oversize coins. If the timing device is to be used to accept dimes, the ears 61 and 63 of the partition 62 will be set in the notches 52 and 60, respectively, of the openings 48 and 56. At such time, the partition 62 and the rearwardly-extending portions 160 and 164 of the plate 152 will again define the width of the coin passageway; but that width will be substantially smaller than the width of that coin passageway, and that width will be close enough to the diameter of a dime to enable the coin passageway to reject oversize coins when the ears 61 and 63 are set in the notches 50 and 58, respectively.

When a quarter is inserted, the diameter of that quarter will be large enough so the left-hand edge of that quarter will have to engage the coin-receiving portion 150 of the actuator 144 as the right-hand edge of that quarter moves downwardly in engagement with the flange 22. Further, the diameter of that quarter will be large enough so the left-hand edge thereof will have to move the coin-receiving portion 150 of the actuator 144 down to almost the very bottom of the slot 44 before that coin-receiving portion will permit that quarter to move downwardly past it.

Similarly, when a nickel is to be accepted, the diameter if the nickel will be large enough so the left-hand edge of that nickel will have to engage the coin-receiving portion 150 of the actuator 144 as the right-hand edge of that nickel moves downwardly in engagement with the partition 62. Further, the diameter of that nickel will be large enough so that the left-hand edge thereof will have to move the coin-receiving portion 150 of the actuator 144 down to almost the very bottom of the slot 44 before that coin-receiving portion will permit that nickel to move downwardly past it.

Again, when a dime is to be accepted, the diameter of the dime will be large enough so the left-hand edge of that dime will have to engage the coin-receiving portion 150 of the actuator 144 as the right-hand edge of that dime moves downwardly in engagement with the partition 62. Further, the diameter of that dime will be large enough so the left-hand edge thereof will have to move the coin-receiving portion 150 of the actuator 144 down to almost the very bottom of the slot 44 before that coin-receiving portion will permit that dime to move downwardly past it.

When a patron inserts a coin of the proper value that coin will, whether it is a quarter, a dime or a nickel, be suitably guided by a chute, not shown, into the space between the inclined portions 26 and 156 of the extensions 24 and 154. Those inclined portions simulate a funnel and will serve to guide the coin down into the space between the extensions 24 and 154. That coin will then enter the coin passageway defined by the plate 152 and the main plate 20; and that coin will promptly engage the ear 172 on the coin deflector 168 and cause that coin deflector to rotate in the clockwise direction in FIG. 2. As that coin deflector so rotates, it will absorb some of the kinetic energy of the coin; but that coin deflector will respond to the remaining kinetic and potential energy of that coin to move far enough to permit that coin to move downwardly past it. As that coin moves further downwardly it will engage the ear 178 on the coin deflector 174, and it will rotate that coin deflector in the clockwise direction. As the coin deflector rotates in that direction, it will absorb further kinetic energy from the coin; but that coin deflector will respond to the residual kinetic and potential energy of that coin to move far enough to permit that coin to move downwardly past it. As that coin moves downwardly between the plate 152 and the right-hand portion of the main plate 20, that coin will engage the coin-receiving portion 150 of the actuator 144 and force that portion 150 to move downwardly toward the lower end of the slot 44.

As the coin-receiving portion 150 of the actuator 144 approaches the lower end of the slot 44, the escapement mechanism, consisting of the pawl 114, the L-shaped lever 130 and the pawl 122, will rotate far enough in the clockwise direction to successively move the ear 128 on the pawl 122 out of engagement with the ratchet wheel 110 and to move the ear 116 on the pawl 114 into engagement with the ratchet wheel 110. At the time the ear 128 moves out of engagement with the tooth which it has been holding, the ear 116 will move into engagement with the outer face of a tooth of the ratchet wheel 110. The ear 116 will thus engage an inclined surface, as shown by FIG. 4; and hence continued clockwise rotation of the escapement mechanism will cause that ear to act upon that inclined surface and thereby force the ratchet wheel to rotate in the clockwise direction. When the ear 116 reaches the innermost portion of that outer face of that tooth, further clockwise rotation of the pawl 114 and of the ratchet wheel 110 will be halted. The inserted coin may rotate the actuator 144 and the L-shaped lever 130 still further in the clockwise direction, and the torsion spring 140 can yield to permit such further rotation; but the rotation of the pawl 114 and of the ratchet wheel 110 will have been halted. This initial rotation of the ratchet wheel 110 will be aided by the bias supplied by the spring within the casing of the switch 74.

After the coin has moved downwardly past the coin-receiving portion 150 of the actuator 144, the spring 142 will start the L-shaped lever 130 rotating in the counter clockwise direction. Such rotation of that lever will cause the upper edge of that lever to engage the ear 118 on the pawl 114 and thereby start rotating that pawl in the counter clockwise direction. As the ear 116 moves out of engagement with the ratchet wheel 110, the ear 128 on the pawl 122 will move into engagement with the inclined face of that tooth which it orginally engaged and held, all as shown by FIG. 6. Further counter clockwise rotation of the escapement mechanism will enable the ear 128 to act upon the inclined face of that tooth and thereby rotate the ratchet wheel 110 further in the clockwise direction. As the pawl 128 reaches the innermost portion of the inclined face of that tooth, it will halt further counter clockwise rotation of the escapement mechanism and will halt further rotation of the ratchet wheel 110. At this time, most of the components of the embodiment of timing device shown in FIGS. 1–10 will again be in the positions shown by FIG. 2. However, the ratchet wheel 110 will have been rotated in the clockwise direction a distance equal to the width of one tooth, and the pin 112 on the ratchet wheel 110 will have been moved to the left sufficiently to permit the movable contact of the switch 74 to engage the normally-open fixed contact of that switch. As a result, that switch will energize the coil of the relay 72; and the contacts of that relay can close a suitable energizing circuit for the unit whose cycle is to be timed. That relay will also establish an energizing circuit for the motor 82; and thereupon the output shaft 84 of that motor will start rotating. Further, the relay 72 will establish a circuit for the lamp in the indicating lamp housing 80.

The shaft 84 will rotate steadily at a predetermined rate; and at the end of a predetermined period of time, one of the shouldered screws 88 on the hub 86 will engage the lower end of the leaf spring 182 and bow that spring to the left in FIG. 2. Such bowing will store up energy within that spring; and that energy will be substantial. As that shouldered screw bows the leaf spring 182 far enough to enable that screw to move out from under the lower end of that spring, that spring will snap back to and beyond the position shown by FIG. 2. The weight 184 on that spring will help bow that spring to a position to the right of the position shown in FIG. 2.

As the spring 182 moves to the right beyond the position shown in FIG. 2, it will engage the ear 94 on the lever 90 and rotate that lever in the clockwise direction. Such rotation will move the ear 100 on the pawl 98 up into engagement with a tooth on the ratchet wheel 110; and further clockwise rotation of the lever 90 will cause that ear to force that ratchet wheel to rotate a distance just greater than the width of a tooth. The extent to which the pawl 98 can rotate the ratchet wheel 110 in the counter clockwise direction is limited by the width of the opening 38; because the ear 104 on the pawl 98 will engage the right-hand side of that opening and halt further clockwise rotation of the lever 90. As that ear engages that right-hand side of the opening it will coact with that side of that opening to apply a clockwise force to the pawl 98 because the pivot 96 is above the level of that ear. Such a force is desirable because it forces the ear 100 into such intimate engagement with the ratchet wheel 110 that there is no chance of that ratchet wheel slipping past the pawl 98 and continuing to rotate in the counter clockwise direction. As the lever 90 and the pawl 98 rotated the ratchet wheel 110 in the counter clockwise direction, the escapement mechanism successively rotated in the clockwise and counter clockwise directions to permit the ratchet wheel to step back a distance slightly greater than the width of a tooth and to thereafter hold that ratchet wheel in that stepped-back position.

Subsequently, the spring 182 will restore itself to the position shown by FIG. 2, and the spring 106 will restore the lever 90 to the position shown by FIG. 2. As the lever 90 rotates from its moved position back to the position shown by FIG. 2, the ear 100 on the pawl 98 will have to move downwardly to clear the tooth which it engaged and moved. The helical extension spring 108 will yield to permit the requisite counter clockwise rotation of the pawl 98.

If the patron had wished to have a longer time cycle, he could have inserted two coins in succession. If he had done so, the insertion of the second coin would again have rotated the escapement mechanism in the clockwise direction and would again have caused the ear 116 to engage, and apply a driving force to, an inclined face of a tooth on the ratchet wheel 110. At this time that ratchet wheel will not be biased for rotation in the clockwise direction because the spring within the casing of switch 74 will no longer be pressing the push button 76 of that switch against the lever 78. That ratchet wheel will, however, rotate in the clockwise direction as the ear 116 on the pawl 114 presses against the inclined face of the tooth which it engages; and that ratchet wheel will rotate until the ear 116 reaches the innermost portion of the inclined face of that tooth. At such time, the ear 128 on the pawl 122 will be in register with the inclined face of the tooth which it had been holding; and when the spring 142 again rotates the escapement mechanism in the counter clockwise direction, the ear 128 on the pawl 122 will engage that inclined face and force the ratchet wheel 110 to rotate further in the clockwise direction. The overall result is that as the escapement mechanism was rotated in the clockwise direction by the second coin and then released for return to its normal position by the spring 142, the ears 116 and 128, respectively, on the pawls 114 and 122 rotated the ratchet wheel 110 in the clockwise direction a distance equal to the width of a tooth. This means that the escapement mechanism not only acts to limit the advancement of that ratchet wheel to just one step at a time, but that escapement mechanism also directly applies driving forces to that ratchet wheel.

The insertion of further coins can lead to the further advancements of the ratchet wheel 110. In the particular embodiment shown in FIGS. 1–10, over twenty-five coins can be accepted and their values credited to the patron. At the end of each cycle, one or the other of the shouldered screws carried by the hub 86 will step the ratchet wheel 110 back a distance equal to the width of a tooth. At the end of the last of the cycles corresponding to the number of inserted coins, the pin 112 on the ratchet wheel 110 will engage the ear 79 at the bottom of the lever 78 and force the button 76 of that switch back into retracted position.

Where nickels are to be accepted, two shouldered screws 88 can be used. Where a dime is to be accepted, one of the shouldered screws 88 can be removed to double the length of the time cycle. Where a quarter is to be accepted, it will usually be desirable to replace the motor 82 with a much slower motor and to use just one shouldered screw 88.

The escapement mechanism is dimensioned so the coin-receiving portion 150 of the actuator must be moved down close to the bottom of the slot 44 before that mechanism can advance the ratchet wheel 110. At that time, the coin-receiving portion 150 will be spaced from the opposite side of the coin passageway a distance substantially equal to the diameter of the inserted coin. This is desirable because it keeps undersize coins from operating the timer.

For example, if the timing device is set to respond to quarters, nickels will be too small in diameter to move the actuator 144 far enough to cause the escapement mechanism to advance the ratchet wheel. Similarly, if the timing device is set to respond to nickels, pennies and dimes will be too small in diameter to move the actuator 144 far enough to cause the escapement mechanism to advance the ratchet wheel. As a result, the timing device can discriminate between coins of different sizes and respond only to coins of the desired size.

The coin deflectors 168 and 174 perform an important function in guiding undersized coins away from the coin-receiving portion of the actuator 144. Those deflectors will urge all coins toward the right-hand side of the coin passageway in FIG. 2, whether that right-hand side be defined by the flange 22 or the partition 62, and will thus make it easy for undersize coins to pass downwardly through the coin passageway without even engaging the coin-receiving portion 150 of the actuator 144, much less engaging that coin-receiving portion and moving that actuator down far enough to enable the escapement mechanism to advance the ratchet wheel 110.

Not only do the coin deflectors 168 and 174 move all coins to the right in FIG. 2, but those deflectors dissipate most of the kinetic energy of those coins. This is desirable because it will keep an undersize coin from moving so fast that it could engage the coin-receiving portion 150 and "ride it down" to the bottom of the slot 44. Any coins that move down past the coin deflectors 168 and 174 will be moving slowly enough to roll off of rather than to "ride" the coin-receiving portion 150. In these ways, the coin deflectors help the timing device respond only to coins of the desired size.

Referring to FIGS. 11–16, the numeral 200 denotes the main plate of a second embodiment of timing device that is made in accordance with the principles and teachings of the present invention. The main plate has a flange 22, an extension 24, a rearwardly-bent portion 26 on the extension 24, ears 28, a pivot 30, an ear 32 and a pivot 34 which are identical to the similarly-numbered parts in FIGS. 1–10.

The main plate has a generally-square opening 202 therein, and that opening is adjacent the right-hand side of that main plate in FIG. 13. That main plate has the ear 32 adjacent the upper left-hand corner thereof and that ear extends forwardly from the front face of that main plate.

A stop 204 is provided on the main plate 200 and that stop is in the upper central area of that main plate. That stop is conveniently formed by punching it forwardly out of the metal of that main plate. An ear 206 is provided on the main plate 200 adjacent the top of that main plate, and that ear is disposed to the right of the ear 32 in FIG. 12. The ear 206 extends forwardly from the main plate 200 in FIG. 12; and that ear is conveniently formed by punching it out of the metal of that main plate. An arcuate slot 208 is formed in the main plate 200, and that slot is disposed to the right of the stop 204 in FIG. 12. That slot inclines downwardly from upper right to lower left in FIG. 12.

The main plate 200 has openings 48, 54 and 56 adjacent the left-hand side of the rear face thereof, and the openings 48 and 56 have notches 50 and 52 and 58 and 60, respectively. Those openings and notches are identical to the similarly-numbered openings and notches in FIGS. 1–10. A movable partition 62, identical to the similarly-numbered partition in FIGS. 1–10, is held by the notches 50 and 58 or 52 and 60.

The numeral 210 denotes a plate which is coextensive with the right-hand portion of the main plate 200 and which has its right-hand edge abutting the left-hand face of the flange 22. That plate has an extension 154 at the top thereof; and that extension is coextensive with the extension 24 on the main plate 200. Further, that extension is offset forwardly from the plane of that main plate. As a result, the extension 154 is spaced from the extension 24 a distance greater than the spacing between the rear face of the plate 210 and the front face of the main plate 200. The top of the extension 154 inclines upwardly and forwardly, and hence that extension coacts with the top 26 of the extension 24 to define a funnel-like coin entrance for the timing device.

A rearwardly-bent portion 212 is provided in the plate 210, and a securing flange 214 extends to the left from that bent portion. A second rearwardly-bent portion 216 is provided on the plate 210, and a securing flange 218 extends to the left from that bent portion. The flanges 214 and 218 will abut the front face of the main plate 200 and will be suitably secured to that main plate. The rearwardly-bent portions 212 and 216 will space the right-hand portion of the plate 210 forwardly of the main plate 200 to define a coin passageway.

The bottom edge of the flange 214 is spaced a distance above the top edge of the flange 218 to provide a gap 220. That gap extends to the right from the vertically-alined left-hand edges of the securing flanges 214 and 218; and it extends to the left-hand edge of the slot 208 in the main plate 200. An arcuate notch 222 is provided in the forwardly-offset, right-hand portion of the plate 210 and that notch inclines from lower left to upper right in FIG. 12. That arcuate notch has the same radius that the slot 208 has, and that notch is partially coextensive with that slot.

An arcuate slot 224 is provided in the plate 210 and that slot starts in the forwardly-offset right-hand portion of that plate, extends through the bent portion 212 and terminates in the securing flange 214. That slot is contiguous with the upper end of the arcuate notch 208; and it inclines from lower right to upper left in FIG. 12.

The numeral 226 denotes a pivot which is secured to the plate 210 adjacent the upper end of that plate. That pivot extends forwardly from the plane of the front face of the plate 210, and it rotatably supports a coin deflector 228. A weight 230 is secured to the coin deflector 228 adjacent the lower end of that deflector, and that weight will normally lie below and in direct vertical alinement with the pivot 226. A coin-receiving pin 232 is secured to the lower end of the coin deflector 228; and that pin extends rearwardly from the deflector 228 and extends through the slot 224. The rear end of that pin will be disposed within the coin-receiving passageway defined by the main plate 200 and the forwardly-offset, right-hand portion of the plate 210.

A ratchet wheel 234 has a hub 236 thereon, and that hub telescopes over, and is rotatable relative to, the pivot 34. That ratchet wheel has a pin 238 thereon, and that pin extends rearwardly from that ratchet wheel but terminates short of the front face of the main plate 200. The teeth of the ratchet wheel are different from the teeth of the ratchet wheel 110 in FIGS. 1–10. Specifically, the teeth on the ratchet wheel 110 resemble obtuse triangles whereas the teeth on ratchet wheel 234 resemble isosceles triangles.

The hub 236 of the ratchet wheel 234 has a slot 240 therein, and one end of a spiral spring 242 extends into and is held by that slot, all as shown by FIG. 14. The major portion of the length of that spring is wound around the hub 236, and then the other end of that spring extends tangentially outwardly from that hub and is held within a slot in a stud 244. That stud is secured to the main plate 200 at a point which is disposed to the left of the ratchet wheel 234, as that ratchet wheel is viewed in FIG. 12.

The numeral 246 generally denotes a lever that is rotatably mounted on the pivot 34, and that lever is disposed adjacent the front face of the ratchet wheel 234. A weight 248 is secured to the lever 246, as by a portion thereof which extends forwardly through an opening in that lever and is then riveted over. The rest of that weight extends rearwardly from the rear face of that lever but terminates short of the front face of the main plate 200. A pivot 250 is secured to and carried by the lever 246, and that pivot extends forwardly from the front face of that lever. A pawl 252 is mounted on the pivot 250 and that pawl can rotate relative to the lever 246. An ear 254 is formed on the pawl 252 adjacent the top of that pawl, and that ear extends forwardly from the plane of that pawl. A second ear 256 is formed on the pawl 252 adjacent the bottom of that pawl, and that ear extends rearwardly from the plane of that pawl. A third ear 258 is also formed on the pawl adjacent the top of that pawl, and that ear also extends rearwardly from the plane of that pawl. The ear 256 abuts the lower edge of the lever 246 and limits rotation of the pawl 252 relative to the lever 246 in the counter clockwise direction. The ear 258 is normally in register with, but is spaced a short distance below, the ratchet wheel 234. That ear can, however, respond to rotation of the pawl 252 in the clockwise direction in FIG. 12 to engage the teeth on that ratchet wheel.

The lower end of the lever 246 has a finger-like extension 260, and that extension projects outwardly beyond the weight 248. A stop 262 is secured to and projects forwardly from the front face of the main plate 200, and that stop is disposed below the ear 204 on that main plate. The stop 262 underlies the extension 260 on the lever 246 and thereby limits clockwise rotation of that lever, whereas the ear 204 overlies that lever and thereby limits counter clockwise rotation of that lever. A C-washer encircles the outer end of the pivot 34 and prevents separation of the lever 246 and of the ratchet wheel 234 from that pivot.

The numeral 264 denotes a pawl which has a hub thereon, and that hub extends forwardly from that pawl. That pawl and the hub thereof have an opening therein and that opening telescopes over the pivot 30. The pawl 264 has an ear 266, and that ear extends forwardly from that pawl at right angles to that pawl. Whenever the pawl 264 is mounted on the pivot 30, the ear 266 will be in register with the teeth on the ratchet wheel 234; and that pawl can be rotated in the counter clockwise direction to place the ear 266 thereof in engagement with the teeth of that ratchet wheel.

The numeral 268 denotes an L-shaped lever which has a hub projecting forwardly from it. That hub and that pawl have an opening therein which enables that pawl and hub to telescope over the forward end of the pivot 30. The rear face of the L-shaped lever 268 will be adjacent the front face of the hub on the pawl 264. The lever 268 has an ear 270 that extends rearwardly from the right-hand end of that lever and that is disposed at right angles to the plane of that lever. Whenever the hub of the lever 268 is telescoped over the pivot 30, the ear 270 will be in register with teeth on the ratchet wheel 234. The lever 268 can be rotated in the clockwise direction to place the ear 270 on that lever in engagement with the teeth of the ratchet wheel 234. A second ear 272 is provided on the lever 268, and that ear lies in the plane of that lever and extends downwardly from that lever. The lever 268 will be disposed forwardly of the front face of the ratchet wheel 234 and the ear 272 will be in register with the ear 266 on the pawl 264. Clockwise rotation of the lever 268 will enable the ear 272 to move into engagement with the ear 266 on the pawl 264 and to move that ear out of the path of the teeth on the ratchet wheel 234.

A helical extension spring 274 has one end thereof hooked through an opening in the pawl 264 and has the other end thereof hooked over the ear 206 on the main plate 200. That spring biases the pawl 264 for rotation in the counterclockwise direction. Such bias normally holds the ear 266 on that pawl in engagement with one of the notches between two of the teeth of the ratchet wheel 234, and thereby normally prevents rotation of that ratchet wheel. However, that spring can yield when the lever 268 is rotated in the clockwise direction and the ear 272 on that lever rotates the ear 266 on the pawl 264 out of engagement with the ratchet wheel 234.

The lever 268 will respond to gravity to tend to rotate in the clockwise direction, but that clockwise rotation will normally be blocked by the engagement of the ear 272 on that lever with the ear 266 on the pawl 264. Consequently, the normal position of the pawl 264 is with its ear 266 in engagement with the ratchet wheel 234, and the normal position of the lever 268 is with its ear 270 disposed above but out of engagement with the ratchet wheel 234. The spring 274 helps the pawl 264 and the lever 268 coact to constitute an escapement element for the ratchet wheel 234. A C-washer seats in a groove at the front end of the pivot 30; and that C-washer permits free rotation of the pawl 264 and of the lever 268 relative to that pivot while preventing accidental separation of that pawl and lever from that pivot.

The lever 268 has an ear 276 at the top edge thereof, and that ear projects forwardly at right angles from the plane of that lever. In addition the lever 268 has two ears 278 and 280 that are struck out of the upper portion of that lever on opposite sides of the ear 276. The ears 278 and 280 incline forwardly and upwardly from the plane of the lever 268 to define sockets.

An actuator 282 has a U-shaped end at the left-hand end thereof, and that U-shaped end is compressed to fit between the lower face of the ear 276 and the inner faces of the ears 278 and 280. That actuator has a bend therein which is spaced to the right of the ear 270 on the lever 268; and the right-hand portion of that actuator inclines downwardly from upper left to lower right towards the lower part of the securing flange 214. Still another bend is provided in the actuator 282; and that bend defines a horizontally-directed, rearwardly-extending, coin-receiving portion 284. The coin-receiving portion 284 extends rearwardly through the notch 208, and the rear face of that coin-receiving portion is close to the front face of the main plate 200. As a result, any coins passing downwardly through the passageway defined by the main plate 200 and the forwardly-offset, right-hand portion of the plate 210 will engage the coin-receiving portion 284 and will move that portion downwardly through the notch 208.

The numeral 286 denotes a leaf spring which is secured to the ear 32 at the upper left-hand corner of the main plate 200. That spring inclines downwardly from upper left to lower right in FIG. 12, and it passes in front of, but closely adjacent, the pivot 34 for the ratchet wheel 234. That spring underlies the ear 254 on the pawl 252. The normal, unstressed position of the spring 286 is shown in solid lines in FIG. 12, and the stressed position of that spring is shown by dotted lines in FIG. 12.

The numeral 288 denotes a bracket which is generally Z-shaped in plan; and a fastener fixedly secures the left-hand portion of that bracket to the main plate 200 adjacent the lower ear 28. The right-hand portion of the bracket 288 is parallel to, but is spaced forwardly of, the main plate 200.

The numeral 290 denotes a timing motor that is secured to the rear face of the main plate 200. That motor has a geared-down output shaft, not shown; and a hub 292 is fixedly mounted on that shaft. The output shaft of the motor 290 is in direct alignment with a pivot, not shown, which is carried by the right-hand portion of the bracket 288 and which extends rearwardly from that right-hand portion. That pivot extends within the hub 292 and constitutes an outboard bearing for the output shaft of the motor 290.

The hub 292 has two threaded sockets therein, and those sockets are spaced from the front face of the main plate 200 distances approximately equal to the distance which the spring 286 is spaced from that front face. As a result, threaded rods 294 and 296 which are set within those threaded sockets will be in register with the lower end of the spring 286. Set-screws lock those threaded rods against rotation relative to the threaded sockets in the hub 292. When the hub 292 is rotated in the counterclockwise direction by the output shaft of the motor 290, the outer ends of those threaded rods will engage the lower end of the spring 286 and bend it from the solid line to the dotted line position in FIG. 12. As those threaded rods bend that spring they gradually store energy within that spring, and then as they pass beyond the lower end of that spring they enable that spring to release its stored-up energy.

The numeral 298 denotes a switch that is mounted at the rear face of the main plate 200. Insulating paper, not shown, such as fish paper or fiber, will be interposed between the forward face of the switch 298 and the rear face of the main plate 200. Fasteners will extend through openings in the housing for the switch 298 and will seat in threaded openings in the main plate 200. A plunger 300 is provided for the switch 298 and that plunger is biased for movement upwardly and outwardly of the housing of that switch. The switch 298 has a resilient actuator 302 that overlies the upper end of the plunger 300, and the right-hand end of that actuator can be moved downwardly, as that actuator is viewed in FIG. 13, to effect opening of the switch. A lateral extension 304 is provided on the actuator 302 and that extension projects forwardly through the opening 202 in the main plate 200. That extension is in register with the pin 238 on the ratchet wheel 234; and that pin will overlie and force that extension down whenever the ratchet wheel 234 is in its normal position. This means that the pin 238 on the ratchet wheel 234 normally holds the switch 298 open. However, when that ratchet wheel rotates in the counterclockwise direction in FIG. 13, the pin 238 on that ratchet wheel will move upwardly and away from the extension 304 and thereby permit the contacts of the switch 248 to close.

The numeral 306 denotes a second switch that is mounted at the rear face of the main plate 200. Insulating paper, not shown, such as fish paper or fiber, will be interposed between the forward face of the housing of the switch 306 and the rear face of the main plate 200. Fasteners pass through openings in the housing of the switch 306 and seat in threaded openings in the main plate 200 to hold the housing for the switch 306 fixed relative to the main plate 200.

The switch 306 has a plunger 308 which can extend outwardly and downwardly from the housing of that switch, and a spring within the housing of the switch 306 biases that plunger to that position. However, that plunger can be retracted upwardly and inwardly of the housing of the switch 306 to cause the movable contact of that switch to make one circuit while it breaks another. The plunger 308 bears against the actuator 302 of the switch 298 and will be in its extended position whenever the pin 238 on the ratchet wheel 234 engages and holds the extension 304 on the actuator 302. At such time, one circuit will be made by the switch 306. However, when the ratchet wheel 234 rotates in the counterclockwise direction in FIG. 13, the pin 238 will move upwardly and away from the extension 304 and permit the actuator 302 to rise upwardly. At this time, the switch 306 will have broken the one circuit and will have made a second circuit. As a result, when the actuator 302 is in its normal, lower position, the switch 298 will be open and one of the circuits of the switch 306 will be closed. When the actuator 302 is in its upper position, the switch 298 will be closed and the other circuit of the switch 308 will be closed while the said one circuit of that switch will be open. The switch 298 is suitably connected to supply power to the timing motor 290 and to a lamp in an indicator lamp housing 80 that is secured to the ears 28 on the main plate 200.

When the owner or operator of the coin-actuated device with which the coin separator of the present invention is used wishes to set a sales price of twenty-five cents he will remove the partition 62. This removal is easily effected by removing the fasteners which hold the flanges 214 and 218, rotating the actuator 282 downwardly into the gap 220 between the bottom edge of the securing flange 214 and the top edge of the securing flange 218 and then moving the plate 210 forwardly and away from the main plate 200. After the plate 210 has been removed, the actuator 282 will again be placed in register with the gap 220 and the plate 210 will be moved back toward the main plate 200 until the securing flanges 214 and 218 abut the front face of that main plate.

When a quarter is introduced into the coin entrance defined by the extensions 24 and 154 on the main plate 200 and the plate 210, respectively, that quarter will move downwardly and engage the coin-receiving pin 232 on the pendant 228. The weight of the quarter will be more than sufficient to force that pendant to rotate in the clockwise direction and thereby permit the quarter to move downwardly. As the quarter so moves, its left-hand edge will engage the coin-receiving portion 284 of the actuator 282, and that actuator will be moved downwardly. That actuator will rotate the L-shaped lever 268 in the clockwise direction about the pivot 30; and such rotation will cause the ear 270 on that lever to move into the path of an adjacent tooth on the ratchet wheel 234. That rotation of the lever 268 will also cause the ear 272 on that lever to force the ear 266 on the pawl 264 out of engagement with the ratchet wheel 234; and as the ear 266 is moved out of engagement with that ratchet wheel, that ratchet wheel will rotate in the clockwise direction a distance less than the width of one tooth. As the quarter moves further downwardly it will cause the coin-receiving portion 284 of the actuator 282 to move almost to the bottom of the slot 208; and that coin-receiving portion will have to move almost that far to enable the lever 268 to move the ear 266 on pawl 264 out of engagement with the ratchet wheel. This is desirable because it keeps coins of lesser diameter from moving the coin-receiving portion 284 of actuator 282 downwardly far enough to free the rachet wheel 234.

Once the quarter has moved downwardly beyond the coin-receiving portion 284, the spring 274 will rotate the actuator 282 in the counter clockwise direction, and thereby rotate the lever 268 in the counter clockwise direction. Thereupon, the ear 270 on the lever 268 will move out of the path of the tooth which it has been holding, and the ear 266 on the pawl 264 will move into engagement with the tooth which succeeds the tooth which that pawl engaged before the insertion of the quarter; and the ear 266 will move into tooth-blocking position before the ear 270 moves out of tooth-holding position. The overall result is that the insertion of a quarter enables the ratchet wheel 234 to respond to the force of the spring 242 of FIG. 14 to rotate in the clockwise direction a distance equal to the width of a tooth on that ratchet wheel.

That rotation enables the actuating arm 302 of the switch 298 to move far enough so the plunger 300 can move upwardly and close the switch 298 and so the plunger 308 will move upwardly and break one of the circuits through the switch 306 while making the other circuit through the switch 306. The circuits in the switch 306 can be connected as desired by the owner or operator of the coin-actuated device, but the switch 298 will be wired so it connects the motor 290 and the lamp in the indicator lamp housing 80 to a suitable source of power. As a result, the motor 290 and the indicating lamp are energized; and they will remain energized until the hub 292 has rotated approximately on hundred and eighty degrees.

As the hub 292 approaches the end of that one hundred and eighty degrees of rotation, the outer end of the threaded rod 296 will have bent the spring 286 from the solid-line to the dotted-line position in FIG. 12, and it will then release that spring. As soon as that spring is released, it will move through and beyond the solid-line position in FIG. 12. As that spring does so, it will promptly engage the ear 254 on the pawl 252; and that engagement will cause that pawl to rotate in the clockwise direction about the pivot 250 and move the ear 258 upwardly into engagement with an adjacent tooth on the ratchet wheel 234. Continued upward deflection of the spring 286 will cause the pawl 252 to rotate the lever 246 and the ratchet wheel 234 as a unit in the counter clockwise direction. The extent to which the lever 246 and the ratchet wheel 234 can rotate in the counter clockwise direction is limited by the engagement of that lever with the stop 204 on the main plate 200. That stop is set so the lever 246 and the pawl 252 can not rotate the ratchet wheel 234 in the counter clockwise direction a distance greater than the width of one tooth per actuation by the spring 286.

As the ratchet wheel 234 rotates in the counter clockwise direction, the tooth which overlies and abuts the ear 266 on the pawl 264 will move that ear to the left and thereby rotate the pawl 264 in the clockwise direction. Such rotation will permit the lever 268 to rotate in the clockwise direction; and thereupon the ear 270 on that lever will move downwardly into the notch defined by two adjacent teeth on the ratchet wheel 234 to prevent unlimited rotation of the ratchet wheel 84.

The spring 286 will halt its upward deflection and then return to its sold-line position in FIG. 12; and as it does so it will permit the spring 274 to pull the ear 266 on the pawl 264 into holding engagement with the upper face of the tooth which that ear released as the spring 286 forced the ratchet wheel 234 to rotate in the counter clockwise direction.. At such time, the various components of the timing device will be back in the positions shown by FIG. 12.

As the ratchet wheel 234 moved one step in the counter clockwise direction in FIG. 12, the pin 238 thereon moved into engagement with the lateral extension 304 on the actuator 302 and forced that actuator downwardly to open the switch 298 and to restore the normally-closed circuit of the switch 306.

The timing device provided by the present invention can accept a number of successively-inserted quarters, and each quarter will move the actuator 282 downwardly and then release it for returning movement to its normal position. As that actuator is moved downwardly and then released, it will act through the escapement mechanism including the pawl 264, the lever 268 and the spring 274 to permit the ratchet wheel 234 to respond to the force of the spring 242 to step in the clockwise direction a distance equal to the width of one tooth. As a result, if four quarters are inserted, the ratchet wheel 234 will step in the clockwise direction a distance equal to the width of four teeth. After the first quarter was inserted the ratchet wheel would have stepped far enough to permit the switch 298 to close and to permit the switch 306 to shift its movable contact. The insertion of the additional three quarters would cause the pin 238 on the ratchet wheel 234 to move further away from the extension 304 on the actuator 302 and will leave the switch 298 closed and will leave the movable contact of the switch 306 in shifted position.

At the end of each period of time corresponding to the insertion of a quarter, the threaded rod 294 or 296 will engage the spring 286 and gradually store energy in that spring and then suddenly release that energy to cause that spring to act through the pawl 264 and the lever 268 to step the ratchet wheel 234 back in the counter clockwise direction a distance equal to the width of a tooth. At the end of four such periods of time, the ratchet wheel 234 will have stepped back far enough to cause the pin 238 thereon to engage the extension 304 and thereby force the actuator 302 down to its normal position.

Where the timing device provided by the present invention is to be used to call for a price of five cents or ten cents, the motor 290 will be replaced by a motor which is the same in size but which will rotate its output shaft at a higher speed than does the motor 290. If the timing device is to be set to respond to dimes, the partition 62 will be set with its ears 61 and 63 lodged within the notches 52 and 60, respectively. Also, one or the other of the threaded rods 294 or 296 will be removed.

When a dime is inserted, that dime will pass downwardly and strike the coin-receiving pin 232; and that pin will force the dime to remain in engagement with the partition 62 as that dime moves downwardly past the coin-receiving pin 232. This is desirable because it means that an undersized coin, having a diameter smaller than that of a dime, will be guided away from the coin-receiving portion 284 of the actuator 282. Further it means that even if that undersize coin does engage the coin-receiving portion 284 of the actuator 282, that coin will not be able to rotate that actuator far enough in the clockwise direction to effect rotation of the ratchet wheel 234 in the clockwise direction. In this connection it should be noted that the actuator 282 must be rotated downwardly until the coin-receiving portion 284 thereof is spaced from the opposite side of the coin passageway a distance almost equal to the diameter of an authentic dime.

The dime will have enough weight to move the coin-receiving pin 232 out of its path and to move into engagement with the coin-receiving portion 284 of the actuator 282. That dime will also be large enough in diameter to move the coin-receiving portion 284 far enough to effect rotation of the ratchet wheel 234 in the clockwise direction. As that ratchet wheel so rotates, it will permit the actuator 362 to move upwardly and to close the switch 298 while shifting the movable contact of the switch 306. Thereupon, the timing motor 290 and the indicator lamp will be energized. That timing motor and that indicator lamp will remain energized throughout one complete rotation of the output shaft of the timing motor 290; but at the conclusion of that revolution, the remaining threaded rod on the hub 292 will cause the spring 286 to flex upwardly, engage the ear 254 on the pawl 252 and thereby step the ratchet wheel 234 back to its normal position.

As was the case when the timing device was set to respond to the insertion of quarters, the timing device can respond to a plurality of successively-inserted dimes. Each dime will effect the rotation of the ratchet wheel 234 one step in the clockwise direction; and hence the timing device can store credits and does not require a patron to wait until the end of one cycle before inserting a further coin. At the end of each predetermined period of time, provided by the timing device, the remaining rod 294 or 296 will cause the spring 286 to act through the pawl 252 and the lever 246 to step the ratchet wheel 234 back one step in the counter clockwise direction. As a result, when the credits accumulated by the insertion of dimes have been used up, the ratchet wheel 234 will cause its pin 238 to engage the extension 304 on the actuator 302 and open the switch 298 while restoring the movable contact of the switch 306 to its normal position.

To enable the timing device of the present invention to respond to nickels, it is only necessary to shift the partition 62 to the position shown by dotted-lines in FIG. 12 and to add the second of the two threaded rods 294 and 296. Inserted nickels will successively engage the coin-receiving pin 232 on the pendant 228 and the coin-receiving portion 284 of the actuator 282, and will then pass downwardly toward the bottom of the coin passageway and release the actuator 282. The resulting clockwise and counter clockwise rotation of the actuator 282 will enable the ratchet wheel 234 to advance one step in the clockwise direction and thereby close the switch 298 while shifting the movable contact of the switch 306. At the end of one half of a revolution of the hub 292, and thus at the end of one half of the time cycle which is provided when just one threaded rod is carried by the hub 292, a threaded rod will cause the spring 286 to effect returning movement of the ratchet wheel 234 to its normal position.

In each instance, the inserted coin is guided by the pin 232 toward the right-hand side of the coin passageway, whether that right-hand side is defined by the flange 22 or the partition 62. As a result, any undersize coins will be guided away from the coin-receiving portion 284 of the actuator 282. This is desirable because it means that such coins will be unable to move the coin-receiving portion 284 far enough away from that right-hand side of the coin passageway to release the ratchet wheel 234 for rotation in the clockwise direction. As a result, the timing device provided by the present invention can differentiate between authentic coins and coins having too small a diameter.

Referring to FIGS. 18–21, the numeral 320 denotes a main plate for a third embodiment of a timing device that is made in accordance with the principles and teachings of the present invention. That main plate is substantially similar to the main plate 20 in FIGS. 1–10. The main plate 320 has ears 28 extending outwardly from the left-hand edge thereof, and those ears support an indicator lamp housing 80. An ear 32 is provided adjacent the upper left-hand corner of the main plate 320. A generally-rectangular opening 36 is provided in the main plate 320, and that opening is disposed to the right of the uppermost of the two ears 28.

A pivot 34 is secured to the main plate 320, and it projects forwardly from that main plate; and that pivot is disposed above and in vertical alignment with the opening 36. A ratchet wheel 322 is rotatably mounted on the pivot 34, and that ratchet wheel will be advanced by an escapement mechanism, not shown, similar to the escapement mechanism shown by FIGS. 1–10. Similarly, that ratchet wheel will be provided with a pin, not shown, which can be used to urge the lever 78 in the counter clockwise direction about the pivot 70 in FIG. 18. The escapement mechanism and the pin and the associated parts are similar to the parts shown in FIGS. 1–10 and need not be shown here.

The numeral 324 denotes a guide bracket which is secured to the front face of the main plate 320. That bracket has a vertically-directed opening therein, and that opening is rectangular in plan view. A second guide bracket 326 is secured to the front face of the main plate 320, and that guide bracket is disposed below but in vertical registry with the guide bracket 324. The guide bracket 326 has a vertically-directed opening through it, and that opening will be aligned with the opening in the guide bracket 324. The opening in the guide bracket 326 also is rectangular in plan.

A bar 328, which is rectangular in cross-section, is disposed within the openings in the guide brackets 324 and 326. The rectangular configuration of that bar coacts with the rectangular configuration of the openings in those guide brackets to prevent rotation of that bar relative to those guide brackets; and yet those openings will permit ready reciprocation of that bar relative to those guide brackets. A weight 330 is provided for the bar 328, and that weight biases that bar for movement to the lower position shown by FIG. 18 and FIG. 20. A collar 332 is secured to the bar 328, and that collar limits the upward movement of the bar 328 relative to the guide brackets 324 and 326. A helical compression spring 334 surrounds the central portion of the bar 328, and the bottom turn of that spring bears against the top face of the guide bracket 326. The top turn of that spring is normally in engagement with the collar 332 as shown by FIG. 18. However, that collar can rise upwardly out of engagement with the top turn of that spring, as shown particularly by FIG. 19.

The numeral 338 denotes a pivot which is carried by the upper end of the bar 328. A pawl 336 is rotatably mounted on that pivot, and that pawl has an ear 340 at the right-hand edge thereof that can abut the right-hand edge of the bar 328 and thereby limit rotation of the pawl 336 in the counter clockwise direction. An ear 342 is provided at the left-hand side of the bar 328, adjacent the upper end of that bar, and that ear has an opening through it. An ear 343 is provided on the pawl 336 adjacent the leading edge 346 of that pawl; and that ear has an opening therein. That opening accommodates the upper end of a helical extension spring 344, and the lower end of that spring is hooked through the opening in the ear 342 on the bar 328. The spring 344 biases the pawl 336 to the position shown by FIGS. 18 and 19; but that spring can yield to enable that pawl to rotate in the clockwise direction about the pivot 338 as the leading edge 346 of that pawl moves to the right to "clear" the teeth on the ratchet wheel 322.

The numeral 84 denotes the output shaft of a timing motor, and a hub 86 is fixedly mounted on that shaft. Shouldered screws 88 are seated in threaded sockets in the hub 86, and those shouldered screws are dimensioned to engage the collar 332, as shown particularly by solid lines in FIG. 18.

In the normal position of the timing device, shown in FIG. 18, the collar 332 lies in the path of the shouldered screws 88. As a result, during each half of a revolution of the output shaft 84, one of the shouldered screws 88 will engage the collar 332 and force that collar and the bar 328 to move downwardly. Such movement will compress the helical compression spring 334; and when that shouldered screw passes beyond the collar 332, the spring 334 will restore itself so rapidly that it will force the bar 328 to move upwardly beyond the normal position of that bar. The mass of the weight 330 will help cause the bar 328 to move upwardly until the collar 332 engages and is held by the under face of the guide bracket 324.

As the bar 328 moves upwardly, the leading edge 346 of the pawl 336 will engage a tooth of the ratchet wheel 322 and will rotate that ratchet wheel in the counter clockwise direction a distance equal to one tooth. As the collar 332 engages and is held by the guide bracket 324, the upper end of the pawl 336 will abut a stop 348 which is secured to the front face of the main plate 320. At such time, the leading edge 346 of the pawl 336 will be disposed inwardly of the circle defined by the tips of the teeth on the ratchet wheel 322. The stop 348 will keep the inertia, imparted to the ratchet wheel 322 by the spring 334, from causing that ratchet wheel to spin in the counter clockwise direction and thereby rotate the pawl 336 in the clockwise direction about the pivot 338. As a result, the leading edge of the pawl 346 will be held in the path of the next lowermost tooth of the ratchet wheel 322 and will positively prevent further counter clockwise rotation of that ratchet wheel.

Subsequently, the weight 330 and the bar 328 will respond to gravity and will move downwardly. As the bar 328 falls, the leading edge 346 of the pawl 336 will engage the inclined face of the aforementioned next lowermost tooth and will be urged to rotate in the clockwise direction. At such time, that leading edge of the pawl 336 will be moving downwardly and away from the stop 348; and, consequently, clockwise rotation of the pawl 336 will be possible at that time. In this way, the pawl 336 will be able to rotate sufficiently to "clear" the teeth of the ratchet wheel 322. After the leading edge of the pawl moves down beyond that next lowermost tooth, that pawl will again rotate in the counter clockwise direction until the ear 340 is again held by the right-hand side of the bar 328. At that time, the leading edge 346 of the pawl 336 will underlie, and be in position to move upwardly into engagement with, that next lowermost tooth.

In the embodiment of timing device, disclosed in FIGS. 18–21, as in the case of the embodiments of timing device disclosed in FIGS. 1–10 and 11–17, energy is gradually stored in a spring. The aforementioned energy is gradually stored within a spring 334 by the timing motor, and then that gradually stored energy will be suddenly released to step the ratchet wheel back the distance of one tooth. Further, as in the case of the timing device of FIGS. 1–10, the pawl 336 will be jammed into a position where it will positively prevent over-shooting rotation of the ratchet wheel. Consequently, the patron will be protected against any loss of credits due to over-shooting of the ratchet wheel.

Referring to FIGS. 22–24, the numeral 20 denotes a main plate which is identical to the correspondingly-numbered main plate in FIGS. 1–10. That main plate has ears 28 at the left-hand edge thereof, and it has an indicator lamp housing 80 supported by those ears. Further, that main plate has an ear 32 at the upper left-hand corner thereof; and it has an ear 40 struck out of the upper edge of that main plate. A generally-rectangular opening 36 is formed in the main plate 20 adjacent the upper of the two ears 28; and a second generally-rectangular opening 38 is formed in the main plate 20 to the right of the opening 36.

A pivot 30 is secured to, and projects forwardly from, the main plate 20; and a pivot 34 also is secured to, and projects forwardly from, the main plate 20. The pivot 34 is disposed to the right of, and slightly below the level of, the pivot 30. A pin 46 is disposed below the level of, and just slightly to the left of, the pivot 34.

The output shaft 84 of a timing motor extends forwardly through the main plate 20; and that output shaft also extends through an opening in a plate 90. That plate has an ear 94 thereon, and that ear projects forwardly from the plane of that plate. The plate 90 has a narrow portion that extends upwardly above the level of the ear 90, and that portion carries a pivot 96. A pawl 98 is rotatably secured to the plate 90 by the pivot 96, and that pawl has an ear 100 which underlies the teeth on the ratchet wheel 110. That pawl also has an ear 104 which extends rearwardly from the plane of that pawl, and that ear normally abuts the right-hand edge of the narrow upper portion of the plate 90. Furthermore, the ear 104 normally abuts the left-hand edge of the opening 38. The pawl 98 also has an ear 102 extending forwardly from it, and that ear has a notch in it.

A helical extension spring 108 has one end thereof hooked through the notch in the ear 102, and has the other end thereof hooked through an opening in an ear 92 on the plate 90. A helical extension spring 106 has one end thereof hooked through an opening in the ear 92 on the plate 90, and has the other end thereof hooked around the pin 46 carried by the main plate 20.

An escapement mechanism is rotatably mounted on the pivot 30; and that escapement mechanism includes the pawl 122, the L-shaped lever 130, and a pawl 114. However, the greatest part of the pawl 114 is obscured in FIG. 22. The L-shaped lever 130 supports the U-shaped left-hand end of an actuator 144; and that actuator extends downwardly and to the right from that lever. A spring 142 biases the escapement mechanism for rotation in the counter clockwise direction in FIG. 22, but that spring can yield to permit clockwise rotation of that escapement mechanism.

The principal difference between the structure in FIGS. 22-24 and the structure in FIGS. 1-10 resides in the pivot 360, the lever 362, the shoulder 364 on that lever, the inclined leading edge 366 on that lever, and the pin 368.

The lever 362 is rotatable about the pivot 360; and, in its normal lower position, the shoulder 364 on that lever engages and holds the extension 79 on the switch lever 78. In doing so, that shoulder will also hold the contacts of the switch 74 in open position, even though the pin 112 on the ratchet wheel 10 moves away from that lever. This is desirable because it makes it possible for the timing device provided by the present invention to require more than one coin to be inserted before the lever 78 can move and thereby permit the switch 74 to close its contacts.

The ratchet wheel 110 has openings therein which can releasably accommodate the pin 368. In one embodiment, the ratchet wheel 110 has three internally-threaded holes to accommodate the threads on the shank of the pin 368. The holes for the pin 368 are spaced from the pin 112 on the ratchet wheel 110 so that whenever the pin 112 engages the ear 79 to hold the lever 78 in switch-opening position, the pin 368 will be spaced from the inclined leading edge 366 on the lever 362. As a result, an inserted coin can engage the coin-receiving portion of the actuator 144 and cause the escapement mechanism to advance the ratchet wheel 110 in the clockwise direction a distance equal to the width of one tooth without permitting the switch lever 78 to move. The engagement of that coin with that coin-responsive portion will cause the pin 112 to move away from the lever 78; but the shoulder 364 on the lever 362 will hold the ear 79 on the lever 78 and keep that lever from moving to switch-closing position.

The insertion of a second coin will cause the escapement mechanism to free the ratchet wheel 110 for another advancement in the clockwise direction; and, toward the end of that advancement, the pin 368 will engage the inclined leading edge 366 on the lever 362 and act to raise that lever up to the position shown by FIG. 22. In that position, the shoulder 364 on the lever 362 will be out of the path of the ear 79 on the switch lever 78; and hence, that lever will be able to respond to the force of the spring within the switch housing to move that lever in the clockwise direction in FIGS. 22-24. Thereupon, the switch 74 will be able to close its contacts.

If desired, in the embodiment shown in FIGS. 22-24, the pin 368 could be set three or four advancements away from the inclined leading edge 366 of the lever 362. Further, if additional openings were to be formed in the ratchet wheel 110, the pin 368 could be spaced five, six, seven or even more advancements away from the inclined ear 366.

A restoring mechanism is shown in part in FIG. 22, and that restoring mechanism will be identical to the restoring mechanism of FIGS. 1-10. As a result, at the end of each half revolution of the hub 86 one of the shouldered screws 88 will engage the lower end of the spring 182 and gradually store energy within that spring. As that shouldered screw moves out of engagement with the lower end of that spring, that spring will be released and will move to the right; thereby rotating the plate 90 and the pawl 98 to cause the ratchet wheel 110 to be stepped in the counter clockwise direction a distance equal to the width of one tooth.

Where desired, the pin 368 can be removed and the lever 362 either blocked up in raised position or removed entirely. At such time, the timing device provided by FIGS. 22-24 will operate in exactly the same manner in which the timing device of FIGS. 1-10 will operate. Specifically, that timing device will respond to an inserted coin to rotate the ratchet wheel 110 in the clockwise direction and thereby permit the switch 74 to close its contacts. However, where it is desired to require a patron to insert two or more coins before the switch lever 78 moves, the pin 368 will be mounted in one of the openings in the ratchet wheel 110, and the lever 362 will be mounted so it can rotate freely into holding engagement with the ear 79 on the lever 78.

Referring to FIG. 25, the numeral 20 denotes a main plate which is identical to the main plate 20 in FIGS. 1-10. A pivot 70 is secured to and extends rearwardly from the rear face of that main plate. A switch lever 78 is rotatably mounted on, and depends downwardly from, the pivot 70. That lever is mounted adjacent a switch 74, and that switch has a plunger 76 projecting outwardly from the housing thereof. Whenever the lever 78 is in the solid-line position shown by FIG. 25, the switch 74 will have its movable contact in engagement with one of the fixed contacts thereof. Whenever the lever 78 is in the dotted-line position shown by FIG. 25, the movable contact of that switch will be in engagement with the other fixed contact of that switch.

An L-shaped bracket 380 is secured to the rear face of the main plate 20, and that L-shaped bracket supports an adjustable stop 382. That stop is shown in the form of a screw, and that screw can be rotated relative to the short leg of the bracket 380. That screw will lie in the path of the lower end of the switch lever 78; and that screw will limit the counter clockwise rotation of that switch lever.

An L-shaped bracket 384 is secured to the rear face of the main plate 20, and the short arm of that bracket supports a permanent magnet 386. That magnet is adjacent the lower end of the switch lever 78, and it will bias that lever into the dotted-line position shown by FIG. 25. That magnet will not be strong enough to shift the lever 78 from the position shown by solid-lines to the position shown by dotted-lines in FIG. 25, but that magnet will be strong enough to hold that switch lever in the dotted-line position after that lever has been moved into that dotted-line position.

A ratchet wheel 110, comparable to the ratchet wheel shown in FIG. 22 will be provided for the timing device shown in FIG. 25. That ratchet wheel will have a fixed pin 112 thereon and will carry a removable pin 368. That removable pin can be set in one of a number of different openings in the ratchet wheel 110.

When the ratchet wheel 110 is in its normal position, the pin 112 thereon will be in the left-handmost of the three positions shown in FIG. 25, and it will be engaging the right-hand face of the switch lever 78 and will be holding the lever 78 in the dotted-line position shown by FIG. 25. At such time, the pin 368 will be disposed to the left of the lever 78 and will be in the left-handmost position shown by FIG. 25.

When a coin engages the coin-receiving portion of the actuator 144 and causes the escapement mechanism to step the ratchet wheel 110 in the counter clockwise direction in FIG. 25, the pin 112 will move to the central position of the three positions shown for that pin in FIG. 25. Such movement will not, however, permit the switch lever 78 to move to the solid-line position in FIG. 25, because the magnet 386 will be holding that lever and the pin 368 will be in the central position of the three positions shown for that pin in FIG. 25, and will thus be out of engagemnet with that switch lever. However, the insertion of an additional coin will cause the escapement mechanism to advance the ratchet wheel 110 an additional step in the counter clockwise direction; and as that ratchet wheel is so advanced, the pin 368 will engage the left-hand side of the switch lever 78 and force that switch lever to move to the solid-line position shown by FIG. 25. At this time, the pin 368 will be in the bottom-most position and the pin 112 will be in the top-most position shown by FIG. 25; and the movable contact of the switch 25 will be in engagement with the normally-open contact of that switch.

The timing device of FIG. 25 will be provided with the restoring mechanism shown in FIGS. 1-10, and that restoring mechanism will provide the required restoration of the switch lever 78 to the dotted-line position shown by FIG. 25. That restoration will occur on a step-by-step basis, and the number of restorative steps will equal the number of coins used to advance the switch lever 78.

In FIGS. 22-25 the brackets 380 and the adjusting stops 382 limit the extent to which the switch levers 78 can rotate in the counter clockwise direction. If it is desirable to permit greater angular movement of the ratchet wheel 110 in the counter clockwise direction in FIG. 25, the L-shaped bracket 380 and its adjusting stop 382 can be removed.

If it ever became desirable to have the timing device of FIG. 25 respond to the first inserted coin to shift the movable contact of the switch 74, the fastener which secures the L-shaped bracket 384 to the main plate 20 could be loosened, and that bracket could rotate downwardly to move the magnet 386 out of register with the switch lever 78; or, if desired, that bracket could be bodily removed from that timing device. At such time, the timing device of FIG. 25 would operate in the same manner in which the timing device of FIGS. 1-10 operates.

If desired, and if the current requirements of the device whose cycle is to be initiated and timed by the timing device provided by the present invention are not unduly great, that device can be connected in parallel with the timing motor. Where that is done, the relay 72 of FIGS. 1-10 and the switch 306 of FIGS. 11-17 can be eliminated.

In FIGS. 1-10 and 11-17, the free ends of the leaf springs 182 and 286, respectively, are directly engaged by the shouldered pins on the hubs driven by the timing motors. This is desirable because the metal of those springs is highly resistant to wear, and hence the wear due to the recurrent restorations of the ratchet wheels will be minimal.

The shouldered pins on the hubs driven by the timing motors engage the leaf springs while the outer ends of those pins are moving in a direction perpendicular to the axes of those springs. This is desirable because it substantially obviates the application of axially-directed forces to the leaf springs. As a result, the forces which are applied to those springs are dominantly bending forces; and those springs are eminently well adapted to sustain such forces.

In the various embodiments of timing devices provided by the present invention, the springs cause the returning pawls to engage the ratchet wheels at times when those ratchet wheels are easily rotated; and hence the fatigue and wear due to such engagements will be minimal. As those pawls move, the ratchet wheels toward the ends of their one-step advancements, those pawls will tend to force themselves into holding engagement with the teeth on those ratchet wheels. At such times, the forces of the springs are largely spent, and hence the fatigue and wear due to the resulting holding engagement are within the capabilities of the material of which the ratchet wheels are made.

Whereas the drawing and accompanying description have shown and described several preferred embodiments of the present invention, it should be apparent to those skilled in the art that various changes may be made in the form of the invention affecting the scope thereof.

What I claim is:

1. A coin-handling device that comprises a coin passageway, a pivot, a ratchet wheel rotatably mounted on said pivot, a second pivot, an escapement mechanism rotatably mounted on said second pivot, said escapement mechanism including an L-shaped lever, a pawl with an ear that can engage the teeth on said ratchet wheel, a second pawl that has an ear that can engage the teeth on said ratchet wheel, and a spring that biases said pawls into engagement with said L-shaped lever and that normally causes said L-shaped lever and said pawls to rotate as a unit, said spring being adapted to yield to permit relative movement between said pawls and said L-shaped lever, a second spring that biases said escapement mechanism for rotation in one direction, the ear on said second pawl normally preventing rotation of said ratchet wheel in the forward direction, an actuator for said escapement mechanism that has a coin-receiving portion which extends into said coin passageway and which can receive a coin and move said escapement mechanism in the opposite direction, the first said pawl responding to movement of said escapement mechanism in said opposite direction to successively move the ear thereof into the path of a tooth on said ratchet wheel and then into engagement with said tooth on said ratchet wheel to force said ratchet wheel to rotate in said forward direction a distance approximating one-half of the width of said tooth, said second pawl responding to said movement of said escapement mechanism in said opposite direction to move the ear thereof out of the path of the teeth on said ratchet wheel after said ear on the first said pawl has moved into the path of said tooth on said ratchet wheel but before said ear on said first pawl has moved into engagement with said tooth on said ratchet wheel, said actuator thereafter responding to said second spring to rotate in said one direction and said ear on said second pawl responding to rotation of said escapement mechanism in said one direction to successively move into the path of an adjacent tooth on said ratchet wheel and then move into engagement with said tooth on said ratchet wheel to force said ratchet wheel to rotate in said forward direction a distance approximating one-half of the width of said tooth, a switch, an actuator for said switch, an abutment on said ratchet wheel that normally holds said switch actuator in position to hold said switch open, a second abutment on said ratchet wheel, a member that normally holds said switch actuator in its normal position but that responds to the movement of said second abutment on said ratchet wheel, as said ratchet wheel moves in said forward direction, to free said switch actuator so said switch can close, the first said abutment on said ratchet wheel responding to said rotation of said ratchet wheel in said forward direction to move out of holding engagement with said switch actuator, said second abutment on said ratchet wheel responding to a later rotation of said ratchet wheel in said forward direction to cause said holding member to free said switch actuator and thereby enable that switch to close, a motor that is energized by said switch whenever said switch actuator moves to permit said switch to close, an abutment that rotates with the output shaft of said motor, a third pawl that is adjacent said ratchet wheel and that has an ear which is normally out of engagement with said ratchet wheel but that can be moved into engagement with said ratchet wheel to rotate said ratchet wheel in the reverse direction, a restoring spring that can respond to rotation of the said abutment which rotates with said output shaft of said motor to gradually store up energy and that subsequently releases said energy to move said ear on said third pawl into engagement with said ratchet wheel and to thereby rotate said ratchet wheel one step in said reverse direction, said escapement mechanism permitting said ratchet wheel to rotate in said reverse direction but thereafter again causing said ear on said second pawl thereof to hold said ratchet wheel against rotation in the forward direction, said coin passageway having a far wall that is in register with, and that is coextensive with the full movement of, said coin-receiving portion of said actuator, said coin-receiving portion of said actuator for said escapement mechanism having to move away from the far wall of said coin passageway until it is spaced from said far wall a distance almost equal to the diameter if an authentic coin of proper denomination before said ear on said second pawl moves out of the path of said teeth on said ratchet wheel whereby under size coins can move downwardly through said coin passageway without moving said actuator for said escapement mechanism far enough to cause said ear on said second pawl to move out of the path of said teeth on said ratchet wheel, and a movable coin deflector that urges all coins entering said coin passageway to move toward said far wall of said coin passageway and thereby away from said escapement mechanism actuator, said far wall of said coin passageway being a removable partition.

2. A coin-handling device that comprises a coin passageway, a pivot, a ratchet wheel rotatably mounted on said pivot, a second pivot, an escapement mechanism rotatably mounted on said second pivot, said escapement mechanism including a pawl with an ear that can engage the teeth on said ratchet wheel and a second pawl that has an ear that can engage the teeth on said ratchet wheel, a spring that biases said escapement mechanism for rotation in one direction, the ear on said second pawl normally preventing rotation of said ratchet wheel in the forward direction, an actuator for said escapement mechanism that has a coin-receiving portion which extends into said coin passageway and which can receive a coin and move said escapement mechanism in the opposite direction, the first said pawl responding to movement of said escapement mechanism in said opposite direction to successively move the ear thereof into the path of a tooth on said ratchet wheel and then into engagement with said tooth on said ratchet wheel to force said ratchet wheel to rotate in said forward direction a distance approximating one-half of the width of said tooth, said second pawl responding to said movement of said escapement mechanism in said opposite direction to move the ear thereof out of the path of the teeth on said ratchet wheel after said ear on the first said pawl has moved into the path of said tooth on said ratchet wheel but before said ear on said first pawl has moved into engagement with said tooth on said ratchet wheel, said actuator thereafter responding to said spring to rotate in said one direction and said ear on said second pawl responding to rotation of said escapement mechanism in said one direction to successively move into the path of an adjacent tooth on said ratchet wheel and then move into engagement with said tooth on said ratchet wheel to force said ratchet wheel to rotate in said forward direction a distance approximately one-half of the width of said tooth, a switch, an actuator for said switch, an abutment on said ratchet wheel that normally holds said switch actuator in position to hold said switch open, said abutment on said ratchet wheel responding to said rotation of said ratchet wheel in said forward direction to move out of holding engagement with said switch actuator, a motor that is energized by said switch whenever said switch actuator moves to permit said switch to close, an abutment that rotates with the output shaft of said motor, a third pawl that is adjacent said ratchet wheel and that has an ear which is normally out of engegement with said ratchet wheel but that can be moved into engagement with said ratchet wheel to rotate said ratchet wheel in the reverse direction, a restoring spring that can respond to rotation of the said abutment which rotates with said output shaft of said motor to gradually store up energy and that subsequently releases said energy to move said ear on said third pawl into engagement with said ratchet wheel and to thereby rotate said ratchet wheel one step in said reverse direction, said escapement mechanism permitting said ratchet wheel to rotate in said reverse direction but thereafter again causing said ear on said second pawl thereof to hold said ratchet wheel against rotation in the forward direction, said coin passageway having a far wall that is in register with, and that is coextensive with the full movement of, said coin-receiving portion of said actuator, said coin-receiving portion of said actuator for said escapement mechanism having to move away from the far wall of said coin passageway until it is spaced from said far wall a distance almost equal to the diameter of an authentic coin of proper denomination before said ear on said second pawl moves out of the path of said teeth on said ratchet wheel whereby undersize coins can move downwardly through said coin passageway without moving said actuator for said escapement mechanism far enough to cause said ear on said second pawl to move out of the path of said teeth on said ratchet wheel, and a movable coin deflector that urges all coins entering said coin passageway to move toward said far wall of said coin passageway and thereby away from said escapement mechanism actuator, said far wall of said coin passageway being a movable partition.

3. A coin-handling device that comprises a coin passageway, a pivot, a ratchet wheel rotatably mounted on said pivot, a second pivot, an escapement mechanism rotatably mounted on said second pivot, said escapement mechanism including a pawl with an ear that can engage the teeth on said ratchet wheel and a second pawl that has an ear that can engage the teeth on said ratchet wheel, a spring that biases said escapement mechanism for rotation in one direction, the ear on said second pawl normally preventing rotation of said ratchet wheel in the forward direction, an actuator for said escapement mechanism that has a coin-receiving portion which extends into said coin passageway and which can receive a coin and move said escapement mechanism in the opposite direction, the first said pawl responding to movement of said escapement mechanism in said opposite direction to successively move the ear thereof into the path of a tooth on said ratchet wheel and then into engagement with said tooth on said ratchet wheel to force said ratchet wheel to rotate in said forward direction a distance approximating one-half of the width of said tooth, said second pawl responding to said movement of said escapement mechanism in said opposite direction to move the ear thereof out of the path of the teeth on said ratchet wheel after said ear on the first said pawl has moved into the path of said tooth on said ratchet wheel but before said ear on said first pawl has moved into engagement with said tooth on said ratchet wheel, said actuator thereafter responding to said spring to rotate in said one direction and said ear on said second pawl responding to rotation of said escapement mechanism in said one direction to successively move into the path of an adjacent tooth on said ratchet wheel and then move into engagement with said tooth on said ratchet wheel to force said ratchet wheel to rotate in said forward direction a distance approximating one-half of the width of said tooth, a switch, an actuator for said switch, an abutment on said ratchet wheel that normally holds said switch actuator in position to hold said switch open, said abutment on said ratchet wheel responding to said rotation of said ratchet wheel in said forward direction to move out of holding engagement with said switch actuator, said coin passageway having a far wall that is in register with, and that is coextensive with the full movement of, said coin-receiving portion of said actuator, said coin-receiving portion of said actuator for said escapement mechanism having to move away from the far wall of said coin passageway until it is spaced from said far wall a distance almost equal to the diameter of an authentic coin of proper denomination before said ear on said second pawl moves out of the path of said teeth on said ratchet wheel whereby undersize coins can move downwardly through said coin passageway without moving said actuator for said escapement mechanism far enough to cause said ear on said second pawl to move out of the path of said teeth on said ratchet wheel, and a movable coin deflector that urges all coins entering said coin passageway to move toward said far wall of said coin passageway and thereby away from said escapement mechanism actuator.

4. A coin-handling device that comprises a coin passageway, a pivot, a ratchet wheel rotatably mounted on said pivot, a second pivot, an escapement mechanism rotatably mounted on said second pivot, said escapement mechanism including a pawl with an ear that can engage the teeth on said ratchet wheel and a second pawl that has an ear that can engage the teeth on said ratchet wheel, a spring that biases said escapement mechanism for rotation in one direction, the ear on said second pawl normally preventing rotation of said ratchet wheel in the forward direction, an actuator for said escapement mechanism that has a coin-receiving portion which extends into said coin passageway and which can receive a coin and move said escapement mechanism in the opposite direction, the first said pawl responding to movement of said escapement mechanism in said opposite direction to successively move the ear thereof into the path of a tooth on said ratchet wheel and then into engagement with said tooth on said ratchet wheel to force said ratchet wheel to rotate in said forward direction a distance approximating one-half of the width of said tooth, said second pawl responding to said movement of said escapement mechanism in said opposite direction to move the ear thereof out of the path of the teeth on said ratchet wheel after said ear on the first said pawl has moved into the path of said tooth on said ratchet wheel but before said ear on said first pawl has moved into engagement with said tooth on said ratchet wheel, said actuator thereafter responding to said spring to rotate in said one direction and said ear on said second pawl responding to rotation of said escapement mechanism in said one direction to successively move into the path of an adjacent tooth on said ratchet wheel and then move into engagement with said tooth on said ratchet wheel to force said ratchet wheel to rotate in said forward direction a distance approximating one-half of the width of said tooth, a switch, an actuator for said switch, an abutment on said ratchet wheel that normally holds said switch actuator in position to hold said switch open, said abutment on said ratchet wheel responding to said rotation of said ratchet wheel in said forward direction to move out of holding engagament with said switch actuator, a motor that is energized by said switch whenever said switch actuator moves to permit said switch to close, an abutment that rotates with the output shaft of said motor, a third pawl that is adjacent said ratchet wheel and that has an ear which is normally out of engagement with said ratchet wheel but that can be moved into engagement with said ratchet wheel to rotate said ratchet wheel in the reverse direction, a restoring spring that can respond to rotation of the said abutment which rotates with said output shaft of said motor to gradually store up energy and that subsequently releases said energy to move said ear on said third pawl into engagement with said ratchet wheel and to thereby rotate said ratchet wheel one step in said reverse direction, said escapement mechanism permitting said ratchet wheel to rotate in said reverse direction but thereafter again causing said ear on said second pawl thereof to hold said ratchet wheel against rotation in the forward direction, said coin passageway having a far wall that is in register with, and that is coextensive with the full movement of, said coin-receiving portion of said actuator, said far wall of said coin passageway being a movable partition.

5. A coin-handling device that comprises a coin passageway, a pivot, a ratchet wheel rotatably mounted on said pivot, a second pivot, an escapement mechanism rotatably mounted on said second pivot, said escapement mechanism including a pawl with an ear that can engage the teeth on said ratchet wheel and a second pawl that has an ear that can engage the teeth on said ratchet wheel, a spring that biases said escapement mechanism for rotation in one direction, the ear on said second pawl normally preventing rotation of said ratchet wheel in the forward direction, an actuator for said escapement mechanism that has a coin-receiving portion which extends into said coin passageway and which can receive a coin and move said escapement mechanism in the opposite direction, the first said pawl responding to movement of said escapement mechanism in said opposite direction to move the ear thereof into the path of a tooth on said ratchet wheel to limit rotation of said ratchet wheel in said forward direction a distance approximating one-half of the width of said tooth, said second pawl responding to said movement of said escapement mechanism in said opposite direction to move the ear thereof out of the path of the tooth on said ratchet wheel after said ear on the first said pawl has moved into the path of said tooth on said ratchet wheel, said actuator thereafter responding to said spring to rotate in said one direction and said ear on said second pawl responding to rotation of said escapement mechanism in said one direction to move into the path of an adjacent tooth on said ratchet wheel to limit rotation of said ratchet wheel in said forward direction a distance approximating one-half of the width of said tooth, a switch, an actuator for said switch, an abutment on said ratchet wheel that normally holds said switch actuator in position to hold said switch open, said abutment on said ratchet wheel responding to said rotation of said ratchet wheel in said forward direction to move out of holding engagement with said switch actuator, said coin passageway having a far wall that is in register with, and that is coextensive with the full movement of, said coin-receiving portion of said actuator, said coin-receiving portion of said actuator for said escapement mechanism having to move away from the far wall of said coin passageway until it is spaced from said far wall a distance almost equal to the diameter of an authentic coin of proper denomination before said ear on said second pawl moves out of the path of said teeth on said ratchet wheel whereby undersize coins can move downwardly through said coin passageway without moving said actuator for said escapement mechanism for enough to cause said ear on said second pawl to move out of the path of said teeth on said ratchet wheel, and a movable coin deflector that urges all coins entering said coin passageway to move toward said far wall of said coin passageway and thereby away from said escapement mechansim actuator.

6. A coin-handling device that comprises a coin passageway, a pivot, a ratchet wheel rotatably mounted on said pivot, a second pivot, an escapement mechanism rotatably mounted on said second pivot, said escapement mechanism including a pawl with an ear that can engage the teeth on said ratchet wheel and a second pawl that has an ear that can engage the teeth on said ratchet wheel and a spring that biases the first said and said second pawls for conjoint rotation, a second spring that biases said escapement mechanism for rotation in one direction, the ear on said second pawl normally preventing rotation of said ratchet wheel in the forward direction, an actuator for said escapement mechanism that has a coin-receiving portion which extends into said coin passageway and which can receive a coin and move said escapement mechanism in the opposite direction, said coin passageway having a far wall that is in register with, and is coextensive with the full movement of, said coin-receiving portion of said actuator, the first said pawl responding to movement of said escapement mechanism in said opposite direction to move the ear thereof into the path of a tooth on said ratchet wheel to limit rotation of said ratchet wheel in said forward direction a distance approximating one-half of the width of said tooth, said second pawl responding to said movement of said escapement mechanism in said opposite direction to move the ear thereof out of the path of the teeth on said ratchet wheel after said ear on the first said pawl has moved into the path of said tooth on said ratchet wheel, said actuator thereafter responding to said second spring to rotate in said one direction and said ear on said second pawl responding to rotation of said escapement mechanism in said one direction to move into the path of an adjacent tooth on said ratchet wheel to limit rotation of said ratchet wheel in said forward direction a distance approximating one-half of the width of said tooth, said coin-receiving portion of said actuator for said escapement mechanism moving away from the far wall of said coin passageway until it is spaced from said far wall a distance almost equal to the diameter of an authentic coin of proper denomination before said ear on said second pawl moves out of the path of said teeth on said ratchet wheel whereby undersize coins can move downwardly through said coin passageway without moving said actuator for said escapement mechanism far enough to cause said ear on said second pawl to move out of the path of said teeth on said ratchet wheel, the first said spring causing coin-induced movement of said actuator to move the first said pawl into engagement with a tooth on said ratchet wheel and thereafter yielding to permit said coin-receiving portion of said actuator to move away from said far wall of said coin passageway until it is spaced from that far wall said distance that is almost equal to the diameter of an authentic coin of proper denomination.

7. A coin-handling device that comprises a coin passageway, a pivot, a ratchet wheel rotatably mounted on said pivot, a second pivot, an escapement mechanism rotatably mounted on said second pivot, said escapement mechanism including a pawl with an ear that can engage the teeth on said ratchet wheel and a second pawl that has an ear that can engage the teeth on said ratchet wheel and a spring that biases the said first and said second pawls for conjoint rotation, a second spring that biases said escapement mechanism for rotation in one direction, the ear on said second pawl normally preventing rotation of said ratchet wheel in the forward direction, an actuator for said escapement mechanism that has a coin-receiving portion which extends into said coin passageway and which can receive a coin and move said escapement mechanism in the opposite direction, the first said pawl responding to movement of said escapement mechanism in said opposite direction to move the ear thereof into the path of a tooth on said ratchet wheel to limit rotation of said ratchet wheel in said forward direction a distance approximating one-half of the width of said tooth, said second pawl responding to said movement of said escapement mechanism in said opposite direction to move the ear thereof out of the path of the teeth on said ratchet wheel after said ear on the first said pawl has moved into the path of said tooth on said ratchet wheel, said actuator therafter responding to said second spring to rotate in said one direction and said ear on said second pawl responding to rotation of said escapement mechanism in said one direction to move into the path of an adjacent tooth on said ratchet wheel to limit rotation of said ratchet wheel in said forward direction a distance approximating one-half of the width of said tooth, the first said spring causing coin-induced movement of said actuator to move the first said pawl into engagement with a tooth on said ratchet wheel and thereafter yielding to permit said coin-receiving portion of said actuator to continue to move in said opposite direction.

8. In a coin-handling device which has spaced walls that define a coin passageway, a ratchet wheel, a member that is mounted adjacent said ratchet wheel and that must be moved before said ratchet wheel can rotate in the forward direction, an actuator for said member that has a coin-receiving portion which extends into said coin-passageway and which will receive coins and be moved by said coins to move said member, said actuator and said member being dimensioned so said coin-receiving portion of said actuator must be spaced from the far wall of said coin passageway a distance almost equal to the diameter of an authentic coin of proper denomination before said member can be moved far enough for said ratchet wheel to start moving in said forward direction, said far wall of said coin passageway being a partition that is disposable at different distances from the initial position of said coin-receiving portion of said actuator to enable said coin-handling device to respond to coins of different diameters, one of said spaced walls and said partition having notches and ears that coact to hold said partition at said different distances and to obviate errors of adjustment due to the use of screws.

9. In a coin-handling device which has a coin passageway, a ratchet wheel, a member that is mounted adjacent said ratchet wheel and that must be moved before said ratchet wheel can rotate in the forward direction, an actuator for said member that has a coin-receiving portion which extends into said coin passageway and which will receive coins and be moved by said coins to move said member, said actuator and said member being dimensioned so that said coin-receiving portion of said actuator must be spaced from the far wall of said coin passageway a distance almost equal to the diameter of an authentic coin of proper denomination before said member can be moved far enough for said ratchet wheel to start moving in said forward direction, and a coin deflector that intercepts coins before said coins can engage said coin-receiving portion of said actuator and that can guide said coins toward said far wall of said coin passageway, said coin deflector having a coin-deflecting portion adjacent the lower end thereof and adjacent said coin-receiving portion of said actuator, whereby coins can fall freely in said coin passageway until they are adjacent said coin-receiving portion of said actuator.

10. A coin-handling device that comprises a coin passageway, a pivot, a ratchet wheel rotatably mounted on said pivot, a second pivot, an escapement mechanism rotatably mounted on said second pivot, said escapement mechanism including an L-shaped lever and a pawl with an ear that can engage the teeth on said ratchet wheel and a second pawl with an ear that can engage the teeth on said ratchet wheel and a spring that biases said pawls into engagement with said L-shaped lever and that normally causes said L-shaped lever and said pawls to rotate as a unit, said spring being adapted to yield to permit relative movement between said pawls and said L-shaped lever, a second spring that biases said escapement mechanism for rotation in one direction, the ear on said second pawl normally preventing rotation of said ratchet wheel in the forward direction, and an actuator for said escapement mechanism that has a coin-receiving portion which extends into said coin passageway and which can receive a coin and move said escapement mechanism in the opposite direction, the first said pawl responding to movement of said escapement mechanism in said opposite direction to successively move the ear thereof into the path of a tooth on said ratchet wheel and then into engagement with said tooth on said ratchet wheel to force said ratchet wheel to rotate in said forward direction a distance approximating one-half of the width of said tooth, said second pawl responding to said movement of said escapement mechanism in said opposite direction to move the ear thereof out of the path of the teeth on said ratchet wheel after said ear on the first said pawl has moved into the path of said tooth on said ratchet wheel but before said ear on said first pawl has moved into engagement with said tooth on said ratchet wheel, said actuator thereafter responding to said second spring to rotate in said one direction and said ear on said second pawl responding to rotation of said escapement mechanism in said one direction to successively move into the path of an adjacent tooth on said ratchet wheel and then move into engagement with said tooth on said ratchet wheel to force said ratchet wheel to rotate in said forward direction a distance approximating one-half of the width of said tooth, the first said spring permitting said actuator to continue to rotate after the first said pawl has engaged and been held by said ratchet wheel.

11. A coin-handling device that comprises a coin passageway, a pivot, a ratchet wheel rotatably mounted on said pivot, a second pivot, an escapement mechanism rotatably mounted on said second pivot, a switch, an actuator for said switch, an abutment on said ratchet wheel that normally holds said switch actuator in position to hold said switch open, a second abutment on said ratchet wheel, and a member that normally holds said switch actuator in its normal position but that responds to the movement of said second abutment on said ratchet wheel, as said ratchet wheel moves in said forward direction, to free said switch actuator so said switch can close, the first said abutment on said ratchet wheel responding to said rotation of said ratchet wheel in said forward direction to move out of holding engagement with said switch actuator, said second abutment on said ratchet wheel responding to a later rotation of said ratchet wheel in said forward direction to cause said holding member to free said switch actuator and thereby enable that switch to close.

12. A coin-handling device that comprises a coin passageway, a pivot, a ratchet wheel rotatably mounted on said pivot, a second pivot, an escapement mechanism rotatably mounted on said second pivot, a switch, an actuator for said switch, an abutment on said ratchet wheel that normally holds said switch actuator in position to hold said switch open, a second abutment on said ratchet wheel, and a member that normally holds said switch actuator in its normal position but that responds to the movement of said second abutment on said ratchet wheel, as said ratchet wheel moves in said forward direction, to free said switch actuator so said switch can close, the first said abutment on said ratchet wheel responding to said rotation of said ratchet wheel in said forward direction to move out of holding engagement with said switch actuator, said second abutment on said ratchet wheel responding to a later rotation of said ratchet wheel in said forward direction to cause said holding member to free said switch actuator and thereby enable that switch to close, said member being a lever with a shoulder thereon, said member having an inclined leading edge that is engaged and moved by said second abutment on said ratchet wheel.

13. A coin-handling device that comprises a coin passageway, a pivot, a ratchet wheel rotatably mounted on said pivot, a second pivot, an escapement mechanism rotatably mounted on said second pivot, a switch, an actuator for said switch, an abutment on said ratchet wheel that normally holds said switch actuator in position to hold said switch open, a second abutment on said ratchet wheel, and a member that normally holds said switch actuator in its normal position but that responds to the movement of said second abutment on said ratchet wheel, as said ratchet wheel moves in said forward direction, to free said switch actuator so said switch can close, the first said abutment on said ratchet wheel responding to said rotation of said ratchet wheel in said forward direction to move out of holding engagement with said switch actuator, said second abutment on said ratchet wheel responding to a later rotation of said ratchet wheel in said forward direction to cause said holding member to free said switch actuator and thereby enable that switch to close, said member being a permanent magnet, said switch actuator having at least a portion thereof of magnetic material.

14. In a coin-handling device which has a coin passageway, a member that must be moved in the forward direction, a second member that is mounted adjacent the first said member and that must be moved a predetermined distance before the first said member can move in said forward direction, a coin-receiving portion on said second member that extends into said coin passageway and that will receive coins and be moved by said coins to move said second member, said members being dimensioned so said coin-receiving portion of said second member must be spaced from the far wall of said coin passageway a distance almost equal to the diameter of an authentic coin of proper denomination before said second member can move far enough for the first said member to start moving in said forward direction, and a coin deflector that intercepts coins before said coins can engage said coin-receiving portion of said second member and that can guide said coins toward said far wall of said coin passageway member, whereby coins can fall freely in said coin passageway until they are adjacent said coin-receiving portion of said second member.

15. In a coin-handling device which has a coin passageway, a member that must be moved in the forward direction, a second member that is mounted adjacent the first said member and must be moved a predetermined distance before the first said member can move in said forward direction, a coin-receiving portion on said second member that extends into said coin passageway and that will receive coins and be moved by said coins to move said second member, said members being dimensioned so said coin-receiving portion of said second member must be spaced from the far wall of said coin passageway a distance almost equal to the diameter of an authentic coin of proper denomination before said second member can move far enough for the first said member to start moving in said forward direction, a movably-mounted coin deflector that intercepts coins before said coins can engage said coin-receiving portion of said second member and that can guide said coins toward said far wall of said coin passageway, and a second movably-mounted coin deflector that intercepts said coins before they engage the first said coin deflector, said second coin deflector absorbing kinetic energy from said coins but permitting said coins to retain sufficient energy to engage, to move, and to pass by the first said coin deflector.

16. In a coin-actuated device, a pivot, a ratchet wheel rotatably mounted on said pivot, an abutment on said ratchet wheel, a second abutment on said ratchet wheel, a mechanism that advances said ratchet wheel in the forward direction step-by-step, a switch that has an actuator, a member that can hold said switch actuator in an initial position but that can be moved to release said switch actuator for movement out of said initial position, the first said abutment on said ratchet wheel responding to reverse rotation of said ratchet wheel to move said switch actuator into said initial position where said member can then hold said switch actuator, said first abutment on said ratchet wheel thereafter responding to movement of said ratchet wheel in said forward direction to move away from said switch actuator, said second abutment being adapted to respond to rotation of said ratchet wheel in said forward direction to move to a position where it can free said switch actuator from said member, said second abutment responding to the first step of said ratchet wheel in said forward direction to move toward said position but stopping short of said position, said second abutment responding to a later step of said ratchet wheel in said forward direction to move into said position, whereby said ratchet wheel can require a plurality of step-by-step advancements thereof before said switch actuator is freed.

17. In a coin-actuated device, a pivot, a ratchet wheel rotatably mounted on said pivot, an abutment on said ratchet wheel, a second abutment on said ratchet wheel, a mechanism that advances said ratchet wheel in the forward direction step-by-step, a switch that has an actuator, a second pivot, a lever rotatably mounted on said second pivot, a shoulder on said lever that can hold said switch actuator in an initial position but that can respond to rotation of said lever to move and release said switch actuator for movement out of said initial position, an inclined leading edge on said lever, the first said abutment on said ratchet wheel responding to reverse rotation of said ratchet wheel to move said switch actuator into said initial position where said shoulder on said lever can then hold said switch actuator, said first abutment on said ratchet wheel thereafter responding to movement of said ratchet wheel in said forward direction to move away from said switch actuator, said second abutment being adapted to respond to rotation of said ratchet wheel in said forward direction to engage said inclined edge on said lever and thereby rotate said lever to cause said shoulder on said lever to release said switch actuator for movement out of said initial position, said second abutment responding to the first step of said ratchet wheel in said forward direction to move toward said inclined edge on said lever but stopping short of said inclined edge, said second abutment responding to a later step of said ratchet wheel in said forward direction to move into engagement with said inclined edge on said lever and thereby rotate said lever to cause said shoulder on said lever to release said switch actuator for movement out of said initial position, whereby said ratchet wheel can require a plurality of step-by-step advancements thereof before said switch actuator is freed.

18. In a coin-actuated device, a pivot, a ratchet wheel rotatably mounted on said pivot, an abutment on said ratchet wheel, a second abutment on said ratchet wheel, a mechanism that advances said ratchet wheel in the forward direction step-by-step, a switch that has an actuator, a lever, a surface on said lever that can hold said switch actuator in an initial position but that can respond to movement of said lever to release said switch actuator for movement out of said initial position, a second surface on said lever, the first said abutment on said ratchet wheel responding to reverse rotation of said ratchet wheel to move said switch actuator into said initial position where the first said surface on said lever can then hold said switch actuator, said first abutment on said ratchet wheel thereafter responding to movement of said ratchet wheel in said forward direction to move away from said switch actuator, said second abutment being adapted to respond to rotation of said ratchet wheel in said forward direction to engage said second surface on said lever and thereby move said lever to cause said first surface thereon to release said switch actuator for movement out of said initial position, said second abutment responding to the first step of said ratchet wheel in said forward direction to move toward said second surface on said lever but stopping short of said second surface, said second abutment responding to a later step of said ratchet wheel in said forward direction to move into engagement with said second surface on said lever and thereby move said lever to cause said first surface thereon to release said switch actuator for movement out of said initial position.

19. In a coin-actuated device, a pivot, a ratchet wheel rotatably mounted on said pivot, an abutment on said ratchet wheel, a second abutment on said ratchet wheel, a mechanism that advances said ratchet wheel in the forward direction step-by-step, a switch that has an actuator, a magnet that can hold said switch actuator in an initial position but that can release said switch actuator for movement out of said initial position, the first said abutment on said ratchet wheel responding to reverse rotation of said ratchet wheel to move said switch actuator into said initial position where said magnet can then hold said switch actuator, said first abutment on said ratchet wheel thereafter responding to movement of said ratchet wheel in said forward direction to move away from said switch actuator, said second abutment being adapted to respond to rotation of said ratchet wheel in said forward direction to engage said switch actuator and to force said switch actuator to move away from said magnet, said second abutment responding to the first step of said ratchet wheel in said forward direction to move toward said switch actuator but stopping short of said switch actuator, said second abutment responding to a later step of said ratchet wheel in said forward direction to move into engagement with said switch actuator and thereby force said switch actuator to move away from said magnet whereby said ratchet wheel can require a plurality of step-by-step advancements thereof before said switch actuator is freed.

References Cited by the Examiner

UNITED STATES PATENTS

| | | | |
|---|---|---|---|
| 535,787 | 3/95 | Burnett | 194—26 |
| 702,918 | 6/02 | Bourne | 194—25 |
| 716,948 | 12/02 | Shortill | 74—1.5 |
| 925,860 | 6/09 | Barnes | 74—1.5 |
| 1,034,604 | 8/12 | Farnsworth | 194 |
| 1,296,654 | 3/19 | Grubb | 74—125 |
| 1,536,145 | 5/25 | Royal | 194—.02 |
| 1,695,593 | 12/28 | Landenberger | 194—19 |
| 1,831,545 | 11/31 | Puff | 200—105 |
| 1,864,144 | 6/32 | Mills | 200—105.1 |
| 1,896,392 | 2/33 | Ryss | 194—100 |
| 1,897,955 | 2/33 | Hoke | 200—105 |
| 2,051,952 | 8/36 | Larson | 194—19 |
| 2,208,831 | 7/40 | Bassett | 74—125 |
| 2,237,573 | 4/41 | Osborne | 74—128 |
| 2,410,708 | 11/46 | Breither et al. | 194—.02 |
| 2,531,882 | 11/50 | Johnson | 200—105.1 |
| 2,573,112 | 10/51 | Schneckenburger | 194—.02 |
| 2,586,129 | 2/52 | Wallin | 194—.02 |
| 2,609,698 | 9/52 | Patzer | 74—128 |
| 2,658,171 | 11/53 | McCallum | 194—.02 |
| 2,839,172 | 6/58 | Kolsky | 194—94 |
| 2,868,026 | 1/59 | Finehout | 74—125 |
| 2,869,375 | 1/59 | Lewis | 74—125 |
| 2,897,937 | 8/59 | Larsen | 194—19 |

FOREIGN PATENTS

| | | |
|---|---|---|
| 21,210 | 18/91 | Great Britain. |
| 474,968 | 11/37 | Great Britain. |

SAMUEL F. COLEMAN, *Primary Examiner.*

LOUIS J. DEMBO, *Examiner.*